(12) United States Patent
Ulupinar et al.

(10) Patent No.: US 8,401,068 B2
(45) Date of Patent: Mar. 19, 2013

(54) DEVICE ATTACHMENT AND BEARER ACTIVATION USING CELL RELAYS

(75) Inventors: Fatih Ulupinar, San Diego, CA (US); Gavin B. Horn, La Jolla, CA (US); Parag A. Agashe, San Diego, CA (US); Nathan E. Tenny, Poway, CA (US); Yongsheng Shi, Falls Church, VA (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 12/604,189

(22) Filed: Oct. 22, 2009

(65) Prior Publication Data

US 2010/0103862 A1 Apr. 29, 2010

Related U.S. Application Data

(60) Provisional application No. 61/108,287, filed on Oct. 24, 2008.

(51) Int. Cl.
*H04B 1/66* (2006.01)
(52) U.S. Cl. .................................................. 375/240
(58) Field of Classification Search .................. None
See application file for complete search history.

(56) References Cited

U.S. PATENT DOCUMENTS

| | | | |
|---|---|---|---|
| 7,301,947 B2 | 11/2007 | Tourunen et al. | |
| 7,876,808 B2 * | 1/2011 | Catreux-Erceg et al. | 375/140 |
| 7,881,247 B2 * | 2/2011 | Pan et al. | 370/319 |
| 8,064,395 B2 | 11/2011 | Gasparroni et al. | |
| 8,064,909 B2 | 11/2011 | Spinelli et al. | |
| 2005/0265363 A1 | 12/2005 | Chen | |
| 2006/0139869 A1 | 6/2006 | Matusz | |
| 2007/0072604 A1 | 3/2007 | Wang | |
| 2007/0230352 A1 | 10/2007 | Kokku et al. | |
| 2008/0123660 A1 | 5/2008 | Sammour et al. | |
| 2008/0144555 A1 | 6/2008 | Hong et al. | |

(Continued)

FOREIGN PATENT DOCUMENTS

| | | |
|---|---|---|
| DE | 202007009672 | 11/2007 |
| EP | 0961516 A2 | 12/1999 |

(Continued)

OTHER PUBLICATIONS

3GPP TS 36.331 (Sep. 2008) Technical Specification; 3rd Generation Partnership Project; Technical Specification Group Radio Access Network; Evolved Universal Terrestrial Radio Access (E-UTRA) Radio Resource Control (RRC); Protocol specification (Release 8), Sep. 1, 2008, pp. 33-34, XP002572886, paragraph 5.3.5, p. 34, lines 1-3, figure 5.3.5.1-1.

(Continued)

*Primary Examiner* — Fan Ng
(74) *Attorney, Agent, or Firm* — Michael DeHaemer

(57) ABSTRACT

Systems and methodologies are described that facilitate assigning TEIDs, or portions thereof, to UEs or other devices during network attachment and/or dedicated bearer activation using one or more cell relays. Relay eNBs can request bearer establishment from a UE, which can be based on receiving an attach accept from an upstream node during attachment for the UE, receiving a bearer setup request from the upstream node, and/or the like. Once a bearer establishment response is received from the UE, the relay eNBs can store a TEID relating to the bearer. This can be a TEID that is at least partially received in the attach accept or bearer setup message, generated for the UE upon receiving the bearer establishment response, and/or the like. The TEID, or portion thereof, can be utilized for subsequent packet routing to the UE through one or more cell relays.

67 Claims, 20 Drawing Sheets

U.S. PATENT DOCUMENTS

| | | | |
|---|---|---|---|
| 2008/0165719 | A1 | 7/2008 | Visotsky |
| 2008/0219203 | A1* | 9/2008 | Chou et al. .................... 370/315 |
| 2008/0240439 | A1 | 10/2008 | Mukherjee et al. |
| 2008/0268846 | A1* | 10/2008 | Shaheen ........................ 455/436 |
| 2009/0042576 | A1 | 2/2009 | Mukherjee et al. |
| 2009/0043902 | A1* | 2/2009 | Faccin ........................... 709/229 |
| 2009/0052409 | A1* | 2/2009 | Chen et al. .................... 370/338 |
| 2009/0080422 | A1 | 3/2009 | Lee et al. |
| 2009/0111423 | A1 | 4/2009 | Somasundaram et al. |
| 2009/0111476 | A1 | 4/2009 | Hamalainen et al. |
| 2009/0196177 | A1 | 8/2009 | Teyeb et al. |
| 2009/0238207 | A1 | 9/2009 | Zhao et al. |
| 2009/0257432 | A1 | 10/2009 | Yamaguchi et al. |
| 2009/0296626 | A1 | 12/2009 | Hottinen et al. |
| 2010/0097976 | A1* | 4/2010 | Agrawal et al. ............... 370/315 |
| 2010/0103845 | A1 | 4/2010 | Ulupinar et al. |
| 2010/0103857 | A1 | 4/2010 | Ulupinar et al. |
| 2010/0103861 | A1 | 4/2010 | Ulupinar et al. |
| 2010/0103863 | A1 | 4/2010 | Ulupinar et al. |
| 2010/0103864 | A1 | 4/2010 | Ulupinar et al. |
| 2010/0103865 | A1 | 4/2010 | Ulupinar et al. |
| 2010/0226314 | A1* | 9/2010 | Xu ................................. 370/328 |
| 2010/0238805 | A1 | 9/2010 | Ludwig et al. |
| 2010/0246533 | A1* | 9/2010 | Lundin et al. ................. 370/332 |
| 2010/0309881 | A1 | 12/2010 | Kim et al. |
| 2011/0044279 | A1 | 2/2011 | Johansson et al. |
| 2011/0222428 | A1 | 9/2011 | Charbit et al. |
| 2012/0120831 | A1 | 5/2012 | Gonsa et al. |
| 2012/0140666 | A1 | 6/2012 | Takahashi et al. |
| 2012/0155375 | A1 | 6/2012 | Zhu |

FOREIGN PATENT DOCUMENTS

| | | |
|---|---|---|
| EP | 1122925 | 8/2001 |
| EP | 1362453 B1 | 11/2003 |
| EP | 1912390 A1 | 4/2008 |
| EP | 1921807 A1 | 5/2008 |
| WO | WO 0225895 A1 | 3/2002 |
| WO | WO 07019672 | 2/2007 |
| WO | WO 2008008145 A2 | 1/2008 |
| WO | WO 08072687 | 6/2008 |
| WO | WO2008125729 | 10/2008 |
| WO | WO2009080601 | 7/2009 |
| WO | WO2009134178 | 11/2009 |

OTHER PUBLICATIONS

3rd Generation Partnership Project; Technical Specification Group Radio Access Network; Evolved Universal Terrestrial Radio Access (E-UTRA); Relay architectures for E-UTRA (LTE-Advanced) (Release 9), 3GPP Draft; R2-095391 TR 36.806 V0.1.0 on Relay Architectures for E-UTRA, 3rd Generation Partnership Project (3GPP); France, No. Miyazki; 20091012, Sep. 1, 2009, XP050389991, paragraph 4, subparagraphs 4.2.1, 4.2.2, 4.2.3, sub-paragraphs 54.2.3.1, 4.2.3.2, figures 4.2.3.1-1 and 4.2.3.1-s, figures 4.2.3.2-1 and 4.2.3.2-2.

"A discussion on some technology components for LTE-Advanced" 3GPP Draft; R1082024 (LTE-Advanced Technology Components), 3rd Generation Partnership Project (3GPP), Mobile Competence Centre; 650, Route Des Lucioles; F-06921 Sophia-Antipolis Cedex; France, vol. RAN WGl, No. Kansas City, USA; 20080514, May 14, 2008, XP050110365, the whole document.

Alcatel-Lucent Shanghai Bell et al: "Considerations on Type II Relay Related Issues," 3GPP Draft, R2-095853 Considerations on Type II Relay Related Issues, 3RD Generation Partnership Project, Mobile Competence Centre, Oct. 16, 2009.

International Search Report—PCT/US2009/061947—International Search Authority, European Patent Office, Sep. 4, 2010.

International Search Report & Written Opinion—PCT/US09/061933, International Search Authority—European Patent Office—Feb. 4, 2010.

International Search Report & Written Opinion—PCT/US09/061934, International Search Authority—European Patent Office—Feb. 4, 2010.

International Search Report & Written Opinion—PCT/US09/061937, International Search Authority—European Patent Office—Feb. 4, 2010.

International Search Report & Written Opinion—PCT/US09/061939, International Search Authority—European Patent Office—Feb. 4, 2010.

International Search Report and Written Opinion—PCT/US2009/062100, International Search Authority—European Patent Office—Aug. 25, 2010.

International Search Report—PCT/US2009/061943—International Search Authority—European Patent Office, May 6, 2010.

"Mapping between Eps bearer and Radio Bearer" 3GPP Draft; R2-081902 Mapping Between EPS Bearer and Radio Bearer, 3RD Generation Partnership Project (3GPP), Mobile Competence Centre ; 650, Route Des Lucioles ; F-06921 Sophia-Antipolis Cedex; France, vol. RAN WG2, No. Shenzhen, China; 20080325, Mar. 25, 2008, XP050139586 [retrieved on Mar. 25, 2008] the whole document.

Panasonic: "Discussion on the Various Types of Relays," 3GPP Draft, R1-082397, 3RD Generation Partnership Project, Mobile Competence Centre, Jun. 24, 2008.

RAN3 LTE-A Rapporteur: "LTE-A RAN3 Baseline Document" 3GPP Draft; R3-091447, 3RD Generation Partnership Project (3GPP), France, San Francisco, USA; May 9, 2009, XP050341769.

Rapporteur (Ericsson): "Updated TP to TR 36.806" 3GPP Draft; R3-092628, 3RD Generation Partnership Project (3GPP), France, No. Miyazaki; Oct. 12, 2009, XP050392105, paragraph 4, subparagraphs 4.2.2, 4.2.3, 4.2.4 and 4.2.4.2, figures 4.2.4.2-1 and 4.2.4.2-2.

"Universal Mobile Telecommunciations System (UMTS) Evolved Universal Terrestrial Radio Access (E-UTRA) and Evolved Universal Terrestrial Radio Access Network (EUTRAN; Overall description; Stage 2 (3GPP TS 36.300 version 8.6.0 Release 8); ETSI TS 136 300" ETSI Standard, European Telecommunications Standards Institute (ETSI), Sophia Antipolis Cedex, France, vol. 3-R2, No. V8.6.0, Oct. 1, 2008, XP014042629, Paragraph 10.5.

"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.2.0 Release 8); ETSI TS 136 300" ETSI Standards, Lis, Sophia Antipolis Cedex, France, vol. 3-R2, No. V8.2.0, Oct. 1, 2007, XP014040285 ISSN: 0000-0001 the whole document.

Vodafone: "Transmission efficiencies and Security for the SI" 3GPP Draft; R3-071610, 3RD Generation Partnership Project (3GPP), Mobile Competence Centre ; 650, Route Des Lucioles ; F-06921 Sophia-Antipolis Cedex ; France, vol. RAN WG3, No. Athens, Greece; Aug. 17, 2007, XP050162419.

* cited by examiner

DEVICE ATTACHMENT AND BEARER ACTIVATION USING CELL RELAYS

CLAIM OF PRIORITY UNDER 35 U.S.C. §119

The present Application for Patent claims priority to Provisional Application No. 61/108,287 entitled "CELL RELAY BASE STATION FOR LTE" filed Oct. 24, 2008, and assigned to the assignee hereof and hereby expressly incorporated by reference herein.

BACKGROUND

1. Field

The following description relates generally to wireless communications, and more particularly to devices attaching to wireless networks and activating radio bearers via cell relay nodes.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. Access points, however, can be limited in geographic coverage area as well as resources such that mobile devices near edges of coverage and/or devices in areas of high traffic can experience degraded quality of communications from an access point.

Cell relays can be provided to expand network capacity and coverage area by facilitating communication between mobile devices and access points. For example, a cell relay can establish a backhaul link with a donor access point, which can provide access to a number of cell relays, and the cell relay can establish an access link with one or more mobile devices or additional cell relays. To mitigate modification to backend core network components, communication interfaces, such as S1-U, can terminate at the donor access point. Thus, the donor access point appears as a normal access point to backend network components. To this end, the donor access point can route packets from the backend network components to the cell relays for communicating to the mobile devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating attaching to a wireless network via one or more cell relays and activating radio bearers for communicating with the wireless network. In particular, upon attachment and/or bearer activation for a device, a relay eNB can associate a tunnel endpoint identifier (TEID), or a portion thereof, to the device. Similarly, a donor eNB, and/or one or more intermediary relay eNBs, can associate the TEID, or a same or different portion thereof, to the next downstream relay eNB. In this regard, packets received from a core network for the device can be appropriately routed through donor and relay eNBs based on the TEID.

According to related aspects, a method is provided that includes receiving a bearer establishment response from a downstream node indicating establishment of a default or dedicated radio bearer for a UE. The method also includes obtaining at least a portion of a TEID for the default or dedicated radio bearer and transmitting an indication of establishment of the default or dedicated radio bearer to an upstream node.

Another aspect relates to a wireless communications apparatus. The wireless communications apparatus can include at least one processor configured to obtain a bearer establishment response from a downstream node relating to establishment of a default or dedicated radio bearer by a UE and determine at least a portion of a TEID for the default or dedicated radio bearer. The at least one processor is further configured to indicate establishment of the default or dedicated radio bearer to an upstream node. The wireless communications apparatus also comprises a memory coupled to the at least one processor.

Yet another aspect relates to an apparatus. The apparatus includes means for receiving a bearer establishment response from a downstream node indicating establishment of a default or dedicated radio bearer for a UE. The apparatus also includes means for obtaining a portion of a TEID for the default or dedicated radio bearer, wherein the means for receiving the bearer establishment response further transmits an indication of establishment of the default or dedicated radio bearer to an upstream node.

Still another aspect relates to a computer program product, which can have a computer-readable medium including code for causing at least one computer to receive a bearer establishment response from a downstream node indicating establishment of a default or dedicated radio bearer for a UE. The computer-readable medium can also comprise code for causing the at least one computer to obtain at least a portion of a TEID for the default or dedicated radio bearer and code for causing the at least one computer to transmit an indication of establishment of the default or dedicated radio bearer to an upstream node.

Moreover, an additional aspect relates to an apparatus including a processing component that receives a bearer establishment response from a downstream node indicating establishment of a default or dedicated radio bearer for a UE. The apparatus can further include TEID component that obtains a portion of a TEID for the default or dedicated radio bearer, wherein the processing component further transmits an indication of establishment of the default or dedicated radio bearer to an upstream node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
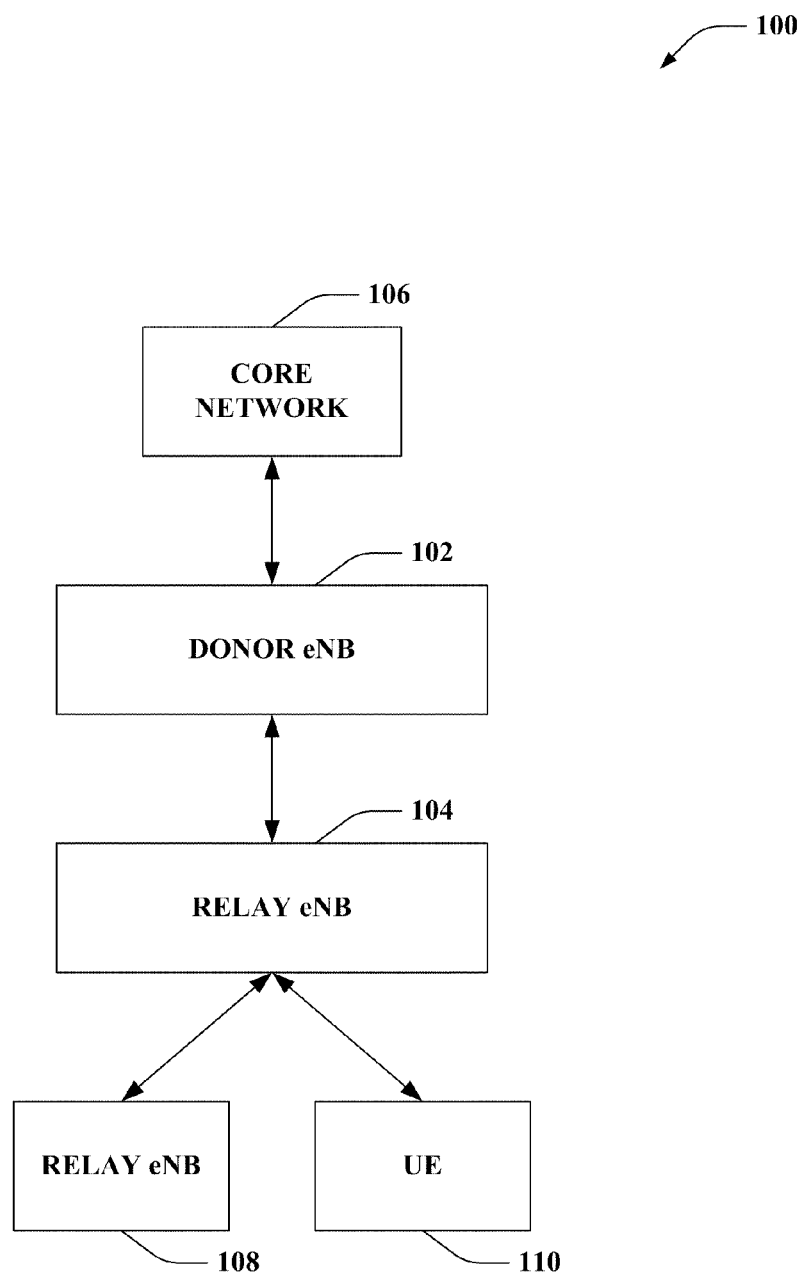
FIG. 1 is an illustration of an example wireless communications system that facilitates providing relays for wireless networks.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates providing relay functionality in wireless networks. System 100 includes a donor eNB 102 that provides one or more relay eNBs, such as relay eNB 104, with access to a core network 106. Similarly, relay eNB 104 can provide one or more disparate relay eNBs, such as relay eNB 108, or UEs, such as UE 110, with access to the core network 106 via donor eNB 102. Donor eNB 102, which can also be referred to as a cluster eNB, can communicate with the core network 106 over a wired or wireless backhaul link, which can be an LTE or other technology backhaul link. In one example, the core network 106 can be a 3GPP LTE or similar technology network.

Donor eNB 102 can additionally provide an access link for relay eNB 104, which can also be wired or wireless, LTE or other technologies, and the relay eNB 104 can communicate with the donor eNB 102 using a backhaul link over the access link of the donor eNB 102. Relay eNB 104 can similarly provide an access link for relay eNB 108 and/or UE 110, which can be a wired or wireless LTE or other technology link. In one example, donor eNB 102 can provide an LTE access link, to which relay eNB 104 can connect using an LTE backhaul, and relay eNB 104 can provide an LTE access link to relay eNB 108 and/or UE 110. Donor eNB 102 can connect to the core network 106 over a disparate backhaul link technology. Relay eNB 108 and/or UE 110 can connect to the relay eNB 104 using the LTE access link to receive access to core network 106, as described. A donor eNB and connected relay eNBs can be collectively referred to herein as a cluster.

According to an example, relay eNB 104 can connect to a donor eNB 102 at the link layer (e.g., media access control (MAC) layer) as would a UE in regular LTE configurations. In this regard, donor eNB 102 can be a regular LTE eNB requiring no changes at the link layer or related interface (e.g., E-UTRA-Uu) to support the relay eNB 104. In addition, relay eNB 104 can appear to UE 110 as a regular eNB at the link layer, such that no changes are required for UE 110 to connect to relay eNB 104 at the link layer, for example. In addition, relay eNB 104 can configure procedures for resource partitioning between access and backhaul link, interference management, idle mode cell selection for a cluster, and/or the like.

With respect to transport layer communications, transport protocols related to relay eNB 108 or UE 110 communications can terminate at the donor eNB 102, referred to as cell relay functionality, since the relay eNB 104 is like a cell of the donor eNB 102. For example, in a cell relay configuration, donor eNB 102 can receive communications for the relay eNB 104 from the core network 106, terminate the transport protocol, and forward the communications to the relay eNB 104 over a disparate transport layer keeping the application layer substantially intact. It is to be appreciated that the forwarding transport protocol type can be the same as the terminated transport protocol type, but is a different transport layer established with the relay eNB 104.

Relay eNB 104 can determine a relay eNB or UE related to the communications, and provide the communications to the relay eNB or UE (e.g., based on an identifier thereof within the communications). Similarly, donor eNB 102 can terminate the transport layer protocol for communications received from relay eNB 104, translate the communications to a disparate transport protocol, and transmit the communications over the disparate transport protocol to the core network 106 with the application layer intact for relay eNB 104 as a cell relay. In these examples, where relay eNB 104 is communicating with another relay eNB, the relay eNB 104 can support application protocol routing to ensure communications reach the correct relay eNB.

Moreover, application layer protocols can terminate at upstream eNBs. Thus, for example, application layer protocols for relay eNB 108 and UE 110 can terminate at relay eNB 104, and similarly for relay eNB 104 can terminate at donor eNB 102. The transport and application layer protocols, for example, can relate to S1-U, S1-MME, and/or X2 interfaces. S1-U interface can be utilized to communicate in a data plane between a node and a serving gateway (not shown) of the core network 106. S1-MME interface can be utilized for control plane communications between a node and a mobility management entity (MME) (not shown) of the core network 106. X2 interface can be utilized for communications between eNBs. In addition, for example, donor eNB 102 can communicate with other relay eNBs to allow communications therebetween over the access network (e.g., relay eNB 104 can communicate with one or more additional relay eNBs connected to donor eNB 102).

According to an example, UE 110 can attach to relay eNB 104 to receive access to core network 106. For example, UE 110 can request attachment to relay eNB 104, which can forward the request to donor eNB 102, which can forward the request to core network 106. Core network 106 can determine whether to allow attachment (e.g., based on a number of factors, such as authentication/authorization, available resources, UE type, service type, and/or the like) and can forward the decision to relay eNB 104 via donor eNB 102. In one example, donor eNB 102 can additionally generate at least a portion of a TEID for the UE or related bearer (e.g., based on a request or otherwise) and forward it in the attachment decision. If attachment is accepted, for example, relay eNB 104 can notify UE 110 to establish a default radio bearer. Upon receiving an establishment response from UE 110 for the default radio bearer, relay eNB 104 can assign a portion of a TEID to relate to UE 110 and its default radio bearer. This can be a portion or entire TEID generated by and received from donor eNB 102, in one example, a separately generated portion, and/or the like. Relay eNB 104 can forward the bearer establishment response from the UE 110 to donor eNB 102 (or one or more intermediary relay eNBs between relay eNB 104 and donor eNB 102), which can include a TEID portion, if generated by the relay eNB 104.

Donor eNB 102 can associate the TEID portion or entire TEID it created with the relay eNB 104, which is the next downstream eNB to UE 110. Where additional intermediary relay eNBs are present, for example, the intermediary relay eNBs can similarly associate the TEID portion or entire TEID with the next downstream relay eNB. The associations can be created in a routing table, for example, associating the TEID or TEID portions with identifiers, such as cell radio network temporary identifiers (C-RNTI), of the next downstream relay eNBs. In addition, donor eNB 102 can create a bearer mapping table that stores an association between the entire TEID and a bearer identifier of the UE 110. Donor eNB 102 can forward the bearer establishment response, or a related message, to the core network 106 comprising the TEID or the TEID portions (e.g., from the donor eNB 102 and relay eNB 104). In this regard, core network 106 can include the TEID or TEID portions in downlink packets related to UE 110, and donor eNB 102 (and any intermediary relay eNBs) can route the downlink packets to relay eNB 104 according to the TEID or TEID portions and the associations (e.g., in the routing table) to next downstream relay eNBs described above.

It is to be appreciated that similar TEID assignment and routing table/bearer mapping table creation can be utilized in activating dedicated bearers for UE 110. For example, core network 106 can transmit a bearer setup request message to donor eNB 102. In one example, donor eNB 102 can generate a TEID for the dedicated bearer; in another example, donor eNB 102 does not create a TEID where a TEID prefix can be associated with relay eNB 104. In either case, donor eNB 102 can forward the request to relay eNB 104. Relay eNB 104 can request bearer establishment from UE 110 for the dedicated bearer and can receive a response therefrom. Where a TEID was received in the request from donor eNB 102, relay eNB 104 can establish an entry in a routing table associating the TEID to UE 110 if the UE 110 bearer setup response indicated success. Where a TEID was not received, relay eNB 104 can generate a TEID suffix for the UE 110. Relay eNB 104, in this case, can forward the suffix to donor eNB 102. In either case, donor eNB 102 can receive a bearer setup response (including a bearer identifier for the dedicated bearer and/or a TEID portion) and store the entire TEID (e.g., as generated, a generated prefix with a received suffix, and/or a generated prefix portion along with received prefix portions and a received suffix) along with the bearer identifier for the dedicated bearer. Donor eNB 102 can transmit the bearer setup response to core network 106 to facilitate subsequent communications to the UE 110 dedicated bearer by routing packets using the routing tables, as described.

In another example, relay eNB 104 can communicate with donor eNB 102 (and/or intermediary relay eNBs) over a relay protocol. In this example, relay eNB 104 can receive a relay identifier from donor eNB 102 (e.g., during a previous relay eNB attachment procedure). Upon receiving a bearer establishment response from UE 110, relay eNB 104 can generate a local TEID associated with the UE 110 bearer, as described. Relay eNB 104 can populate a relay protocol header with the assigned relay identifier and an upper layer protocol with the TEID. Relay eNB 104 can transmit the relay protocol packet to the donor eNB 102 acknowledging bearer establishment, for example, and the donor eNB 102 can include the relay identifier and/or TEID in a related bearer establishment message to the core network 106. In this regard, for example, core network 106 can provide the relay identifier and/or TEID in related packets for relay eNB 104 to donor eNB 102, and donor eNB 102 can route the packets using a relay protocol with the relay identifier in the header. Intermediary relay eNBs, where present, can receive the relay protocol packets, obtain the relay identifier, determine a related next downstream relay eNB (e.g., from a routing table), and forward the packet to the next downstream relay eNB. Relay eNB 104 can receive the packet and provide data to UE 110 based on the TEID in the packet, for example. Similarly, in a dedicated bearer activation procedure, for example, relay eNB 104 can include the TEID In a bearer setup response to donor eNB 102, which can store the TEID along with a bearer identifier for the dedicated radio bearer in a dedicated bearer mapping table, as described.

Figure 2:
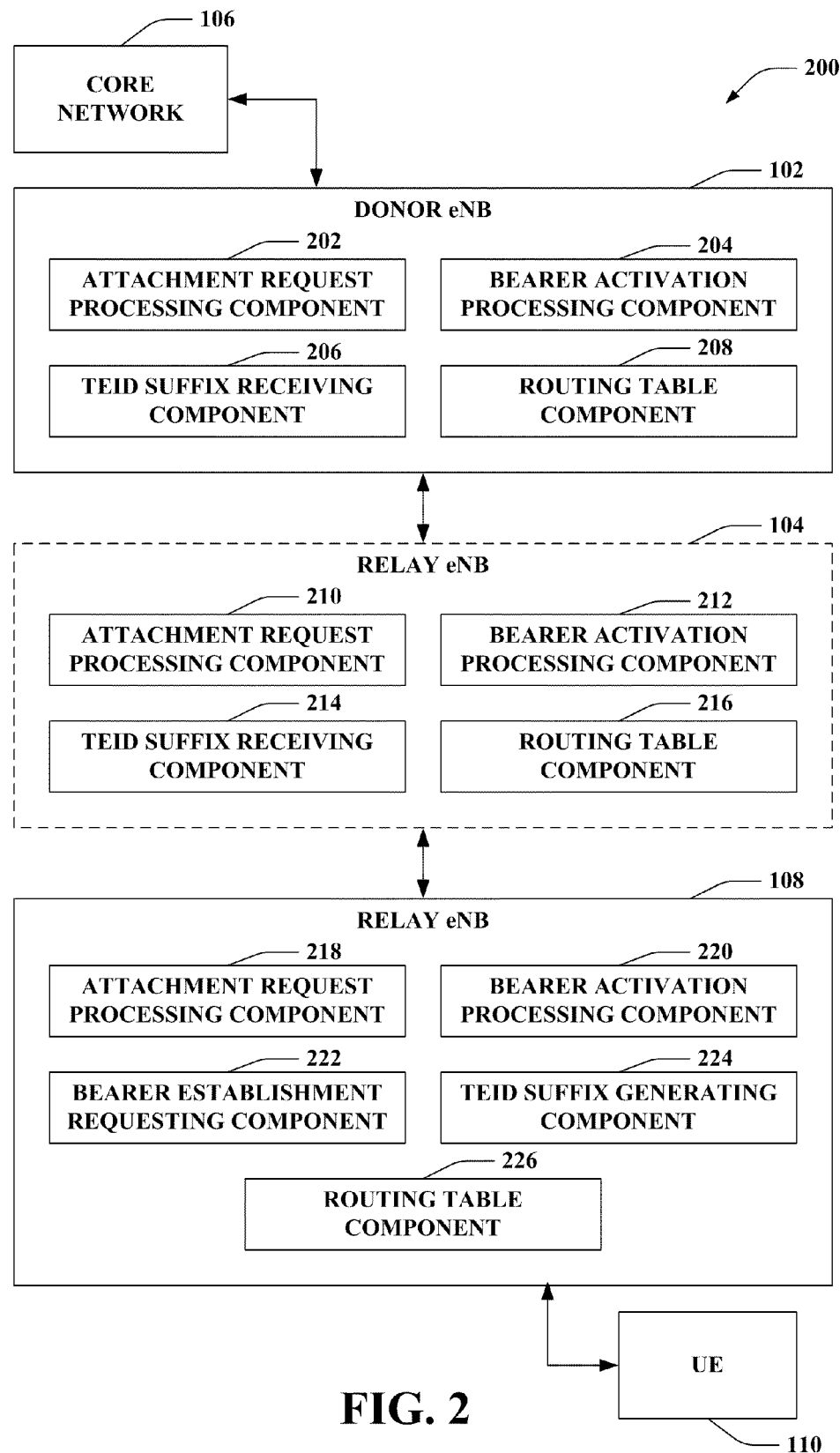
FIG. 2 is an illustration of an example wireless communications system that facilitates assigning a portion of a tunnel endpoint identifier (TEID) to an established bearer.

Turning now to FIG. 2, an example wireless communication system 200 that facilitates attaching a UE to a wireless network and/or activating dedicated bearers thereof via cell relay is illustrated. System 200 includes a donor eNB 102 that provides relay eNB 104 (and/or other relay eNBs) with access to core network 106. Additionally, as described, relay eNB 104 can provide relay eNB 108 with access to the core network 106 through the donor eNB 102. In an example, however, relay eNB 104 may not be present, and relay eNB 108 can communicate directly with donor eNB 102. In a similar example, there can be multiple relay eNBs 104 between the donor eNB 102 and relay eNB 108. In addition, it is to be appreciated that relay eNB 108 can comprise the components of relay eNB 104 and provide similar functionality, in one example. Moreover, donor eNB 102 can be a macrocell access point, femtocell access point, picocell access point, mobile base station, and/or the like. Relay eNBs 104 (and relay eNB 108) can similarly be mobile or stationary relay nodes that communicate with donor eNB 102 (and relay eNB 104) over a wireless or wired backhaul, as described.

Donor eNB 102 comprises an attachment request processing component 202 that receives attachment requests from downstream relay eNBs, forwards the requests to core network 106, and processes request responses, a bearer activation processing component 204 that receives dedicated bearer activation requests from a core network 106 and forwards the requests downstream to facilitate establishing dedicated UE bearers, a TEID suffix receiving component 206 that obtains a TEID suffix assigned to a default or dedicated radio bearer of a UE from a downstream relay eNB, and a routing table component 208 that maintains a routing table associating TEID prefixes to identifiers (e.g., C-RNTI) of related downstream relay eNBs for subsequent packet routing, as well as, for example, a bearer mapping table associating TEIDs with default or dedicated bearer identifiers.

Relay eNB 104 can include an attachment request processing component 210 that forwards network attachment requests to one or more upstream eNBs and processes responses therefrom, a bearer activation processing component 212 that receives dedicated bearer activation requests from an upstream eNB and forwards the requests downstream to facilitate establishing dedicated UE bearers, a TEID suffix receiving component 214 that obtains a TEID suffix assigned to a default or dedicated radio bearer of a UE from a downstream relay eNB, and a routing table component 216 that stores associations between TEIDs and identifiers (e.g., C-RNTI) of related downstream relay eNBs for subsequent packet routing, as well as, for example, a bearer mapping table associating TEIDs with default or dedicated bearer identifiers.

Relay eNB 108 comprises an attachment request processing component 218 that receives attachment requests from a connected UE and forwards the requests upstream processing responses thereto, a bearer activation processing component 220 that receives dedicated bearer activation requests from upstream eNBs and forwards the requests downstream to facilitate establishing dedicated UE bearers, a bearer establishment component 222 that requests default or dedicated bearer establishment from a connected UE based on an attachment response, a TEID suffix generating component 224 that creates a TEID suffix for a default or dedicated radio bearer of UE 110, and a routing table component 226 that associates the TEID suffix to an identifier (e.g., C-RNTI) of the related UE 110 or a default/dedicated radio bearer thereof for subsequent packet routing.

According to an example, relay eNB 108 can have previously attached to the core network 106 via relay eNB 104 and donor eNB 102 (which can also have previously attached). In this regard, donor eNB 102 and/or relay eNB 104 can have generated a TEID prefix or portion thereof related to relay eNB 108 to facilitate routing packets thereto. UE 110 can request attachment to core network 106 through relay eNB 108. In this example, attachment request processing component 218 can receive the attachment request and forward the request upstream to relay eNB 104, if present. Attachment request processing component 210 can similarly receive and forward the attachment request to donor eNB 102. Attachment request processing component 202 can receive the attachment request and forward to core network 106 for granting or denying. For example, core network 106 can perform authentication/authorization, security procedures, and/or the like for UE 110. Core network 106 can transmit an attachment response to donor eNB 102, such as an attach accept message.

Attachment request processing component 202 can transmit the attach accept to relay eNB 104, if present. In one example, attachment request processing component 202 can have determined a portion of a TEID in the attach accept that was included in the initial attachment request, which relates to relay eNB 108. Routing table component 208 can determine that relay eNB 104 is the next downstream relay eNB to relay eNB 108 based at least in part on an entry in the routing table component 208 of the TEID portion associated with a bearer identifier of relay eNB 104 stored during a previous attachment procedure for relay eNB 108. Attachment request processing component 210 can receive the attach accept and similarly forward to relay eNB 108 (e.g., based on routing table component 216). Attachment request processing component 218 can receive the attach accept related to UE 110, whether from relay eNB 104 or donor eNB 102. In one example, attachment request processing component 218 can request transport address translation from donor eNB 102 via relay eNB 104, as described further herein.

Bearer establishment requesting component 222 can transmit a bearer establishment request to UE 110 (e.g., an RRC connection reconfiguration or similar message), and can receive a bearer establishment response (e.g., an RRC connection reconfiguration complete or similar message) from UE 110. If the bearer establishment response indicates successful default radio bearer setup, for example, TEID suffix generating component 224 can create a TEID suffix for the default radio bearer. It is to be appreciated that this can be performed before receiving the bearer establishment response, in one example. Routing table component 226 can store an association between the TEID suffix, an identifier for the UE 110 (e.g., a C-RNTI and/or the like), and an identifier of the default radio bearer. In one example, the routing table can have a format similar to the following.

| TEID Suffix | UE Identifier (C-RNTI) | Radio Bearer ID |
|---|---|---|
| bb | xx | Mm |
| ... | ... | ... |

Attachment request processing component 218 can transmit an attachment confirmation message, such as an attach complete, to relay eNB 104. In one example, attachment request processing component 218 can include an identifier of the default radio bearer for UE 110, the TEID suffix, and/or the like in the attach complete. Attachment request processing component 210 can obtain the attach complete where relay eNB 104 is present, and in one example, TEID suffix receiving component 214 can extract the TEID suffix, if present, and/or default radio bearer identifier for UE 110 from the attach complete. Routing table component 216 can store an association between the entire TEID (e.g., one or more TEID prefix portions along with the TEID suffix) and the identifier for the default radio bearer in a bearer mapping table. In one example, the bearer mapping table can have a format similar to the following.

| TEID | Radio Bearer ID |
|---|---|
| aabb | mm |
| ... | ... |

Attachment request processing component 210 can forward the attach complete to donor eNB 102. It is to be appreciated that if relay eNB 104 is not present, attachment request processing component 218 forwards the attach complete to donor eNB 102. TEID suffix receiving component 206 can similarly extract the TEID suffix, if present, and/or default radio bearer identifier for UE 110 from the attach complete. Routing table component 208 can similarly store an association between the entire TEID (e.g., one or more TEID prefix portions along with the TEID suffix) and the identifier for the default radio bearer in a bearer mapping table. Subsequently, UE 110 can transmit communications to relay eNB 108, which can add the TEID to the message to facilitate subsequent routing of response packets received from core network 106.

As described, similar functionality can be provided for dedicated bearer activation. Thus, for example, bearer activation processing component 204 can receive a request for dedicated bearer activation for UE 110 from core network 106. The setup request can include the TEID related to UE 110 or the bearer to be established. Thus, bearer activation processing component 204 can forward the bearer setup request downstream to relay eNB 104, if present or otherwise relay eNB 108, based on an entry in routing table component 208 associating the TEID with relay eNB 104 as a next downstream relay eNB. Bearer activation processing component 212 can similarly receive and forward the bearer setup request to relay eNB 108. Bearer activation processing component 220 can receive the bearer setup request, and bearer establishment requesting component 222 can transmit a bearer establishment request message to UE 110 for the dedicated bearer and can receive a response message from UE 110.

As described in the context of attachment procedure, if bearer establishment requesting component 222 receives a successful bearer establishment message from UE 110, TEID suffix generating component 224 can create a suffix for the dedicated bearer, and routing table component 226 can store the suffix along with a UE 110 identifier and/or an identifier of the dedicated radio bearer for subsequent packet routing, as described. Bearer activation processing component 220 can transmit a bearer setup complete message to relay eNB 104, if present. Bearer activation processing component 212 can receive the bearer setup complete message. As described previously, TEID suffix receiving component 214 can extract the TEID suffix and/or bearer identifier of the dedicated bearer, and routing table component 216 can store an entry in the bearer mapping table. Bearer activation processing component 212 can transmit the bearer setup complete message to donor eNB 102. Bearer activation processing component 204 can similarly receive the bearer setup complete message. As described previously, TEID suffix receiving component 206 can similarly extract the TEID suffix and/or bearer identifier of the dedicated bearer, and routing table component 208 can store an entry in the bearer mapping table.

Figure 3:
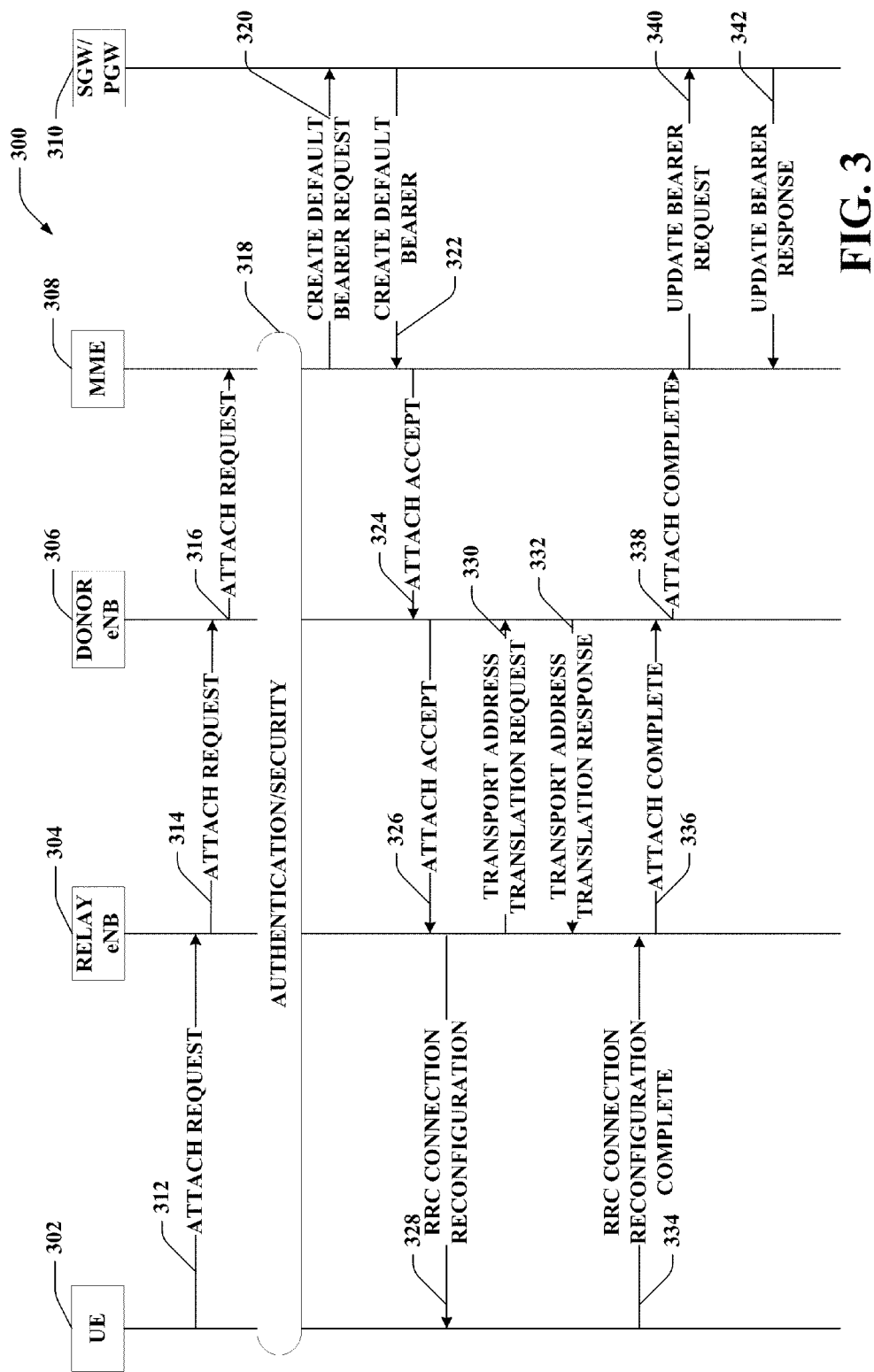
FIG. 3 is an illustration of an example wireless communications system that attaches a device to a network and assigns a portion of a TEID for a bearer thereof.

Referring to FIG. 3, an example wireless communication system 300 for attaching to a wireless network through one or more cell relays is illustrated. System 300 includes a UE 302 that communicates with a relay eNB 304 to receive access to a wireless network. Relay eNB 304 communicates with a donor eNB 306, as described, to receive access to network components. The wireless network components depicted include an MME 308 and SGW/PGW 310. As shown, UE 302 can transmit an attach request 312 to relay eNB 304. It is to be appreciated that UE 302 can have initially received communication resources from relay eNB 304 (e.g., via random access procedure, RRC Connection Setup messages, etc.).

Relay eNB 304, in one example, can derive an MME from a globally unique temporary identifier (GUTI) in the attach request. If the MME is not association with relay eNB 304, it can select MME 308 based at least in part on an MME selection function. Relay eNB 304 can forward the attach request 314 to donor eNB 306, which can forward the attach request 316 to MME 308. In response, MME 308 can initiate authentication/security procedures 318 with UE 302 to ensure it is authorized to access the wireless network. This can include, for example, exchanging messages among various core network components, such as MME 308, SGW/PGW 310, policy charging and rules function (PCRF), home subscriber service (HSS), etc.

Once MME 308 determines that UE 302 is authorized and/or determines the appropriate SGW/PGW (e.g., based on a disparate selection function), it can allocate an EPS bearer identifier for the default bearer and initiate a create default bearer request 320 to SGW/PGW 310. SGW/PGW 310 can create the default bearer and transmit a create default bearer 322 to MME 308. MME 308 can accordingly transmit an attach accept 324 to donor eNB 306. It is to be appreciated that where the MME allocates a new GUTI, the GUTI can be included in the attach accept 324. In addition, the attach accept 324 can include quality of service (QoS) information for setting up the radio bearer at the UE 302, a TEID at the SGW/PGW 310, and/or an address of the SGW/PGW 310. Donor eNB 306 can forward the attach accept 326 to relay eNB 304, e.g., based on locating the relay eNB 304 as relating to the attach accept 324 in a routing table as described. Relay eNB 304 can transmit an RRC connection reconfiguration 328 to UE 302 to facilitate establishing a default radio bearer for communicating with UE 302. In an example, relay eNB 304 can optionally transmit a transport address translation request 330 to donor eNB 306. In this regard, donor eNB 306 can establish an IP address mapping table to map an IP address of the SGW/PGW 310 to a certain value (e.g., a smaller sized value). In one example, the IP address mapping table can have a format similar to the following.

| SGW IP Address | Compressed IP Address |
| --- | --- |
| x.x.x.x | One byte size value |
| y.y.y.y | One byte size value |

Donor eNB 306 can transmit the transport address translation response 332 to relay eNB 304 including the translation value, and/or one or more IP address to compressed address pairs. Thus, in subsequent transmissions, relay eNB 304 and/or donor eNB 306 can compress a portion of a packet to translate the SGW IP address to the one byte size value to save bandwidth requirements for packet transmission. UE 302 can initialize the default radio bearer and transmit an RRC connection reconfiguration complete 334 to relay eNB 304, which can include an attach complete message generated by UE 302.

Relay eNB 304 can generate a TEID suffix for the default radio bearer of UE 302, as described, and can transmit the attach complete message from the RRC connection reconfiguration complete, attach complete 336, to donor eNB 306, which can include the TEID suffix, in one example. Donor eNB 306 can store the TEID suffix (e.g., with one or more prefix portions to create an entire TEID) and/or an identifier of the default radio bearer of UE 302 in a routing table. Donor eNB 306 can forward the attach complete 338 to MME 308. Upon receiving the attach complete 338, MME 308 can transmit an update bearer request 340 to SGW/PGW 310, and SGW/PGW 310 can acknowledge the update bearer request 340 with an update bearer response 342 to MME 308.

Figure 4:
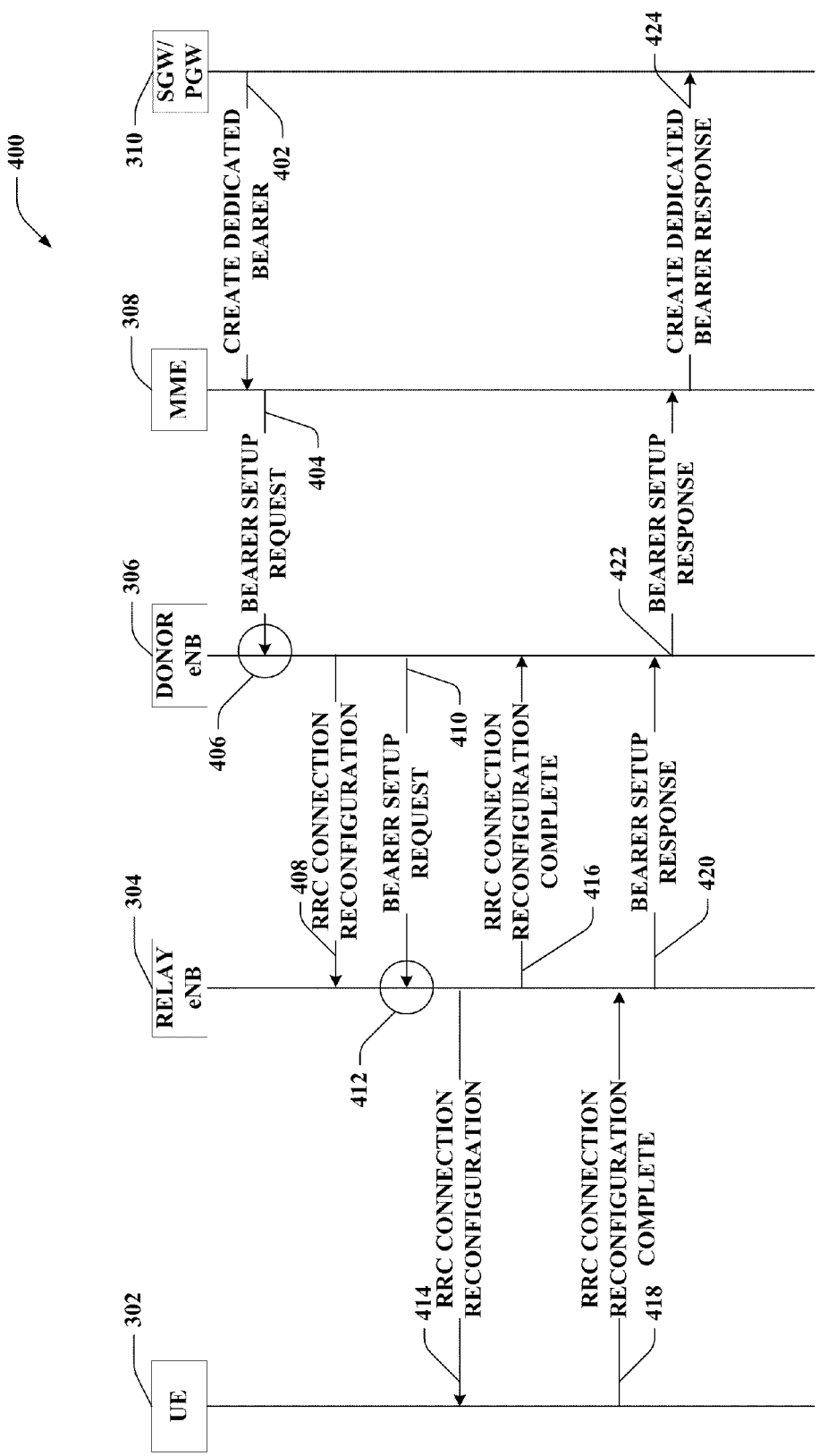
FIG. 4 is an illustration of an example wireless communications system that activates a device dedicated bearer and assigns a portion of a TEID for the bearer.

Referring to FIG. 4, an example wireless communication system 400 for activating dedicated bearers through one or more cell relays is illustrated. System 400 includes a UE 302 that communicates with a relay eNB 304 to receive access to a wireless network. Relay eNB 304 communicates with a donor eNB 306, as described, to receive access to network components. The wireless network components depicted include an MME 308 and SGW/PGW 310. As shown, SGW/PGW 310 can transmit a create dedicated bearer 402 to MME 308, which can include bearer QoS parameters, SGW TEID, etc., to facilitate activating a UE dedicated bearer. MME 308 can accordingly transmit a bearer setup request 404 to donor eNB 306, which can include an EPS bearer identifier selected by MME 308 (which has not been assigned to UE 302), the bearer QoS, session management configuration information, SGW TEID, and/or the like. Donor eNB 306 can perform admission control 406 or other QoS procedure to determine resource allocation based on bandwidth, latency, and/or the like, for example.

Donor eNB 306 can transmit an RRC connection reconfiguration 408 to relay eNB 304 (e.g., to modify one or more QoS characteristics therewith). For example, if there is a maximum number of data radio bearers limitation, donor eNB 306 can establish a radio bearer that maps the EPS bearer. Alternatively, if radio bearers are pre-established, donor eNB 306 can map the EPS bearer to the appropriate bearer of relay eNB 304 sending the RRC connection reconfiguration with updated QoS parameters. If radio bearers are not pre-established, donor eNB 306 can send the RRC connection reconfiguration to the relay eNB 304 to establish a radio bearer that maps to the EPS bearer. In any case, donor eNB 306 can additionally transmit the bearer setup request 410 to relay eNB 304. Relay eNB 304 can similarly perform admission control 412. Relay eNB 304 can transmit an RRC connection reconfiguration complete 416 to donor eNB 306 to acknowledge radio bearer activation.

Relay eNB 304 can similarly transmit an RRC connection reconfiguration 414 to UE 302 that maps the EPS bearer. UE 302 can acknowledge the dedicated radio bearer activation by transmitting an RRC connection reconfiguration complete 418 to relay eNB 304. Relay eNB 304 can generate a TEID suffix for the default radio bearer of UE 302, as described, and can transmit a bearer setup response 420, to donor eNB 306, which can include the TEID suffix, in one example. Donor eNB 306 can store the TEID suffix (e.g., with one or more prefix portions to create an entire TEID) and/or an identifier of the default radio bearer of UE 302 in a routing table. Donor eNB 306 can forward the bearer setup response 422 to MME 308. Upon receiving the bearer setup response 422, MME 308 can transmit a create dedicated bearer response 424 to SGW/PGW 310 indicating whether the dedicated bearer is activated.

It is to be appreciated, for example, that admission control 406 or 412 can be unsuccessful, in which case the respective bearer setup response 422 or 420 can indicate such. In this example, if admission control 412 fails, donor eNB 306 can transmit a connection reverse message, such as RRC connection reconfiguration reverse, to relay eNB 304, which can terminate the connection for the dedicated bearer and respond with a connection reverse complete message.

Figure 5:
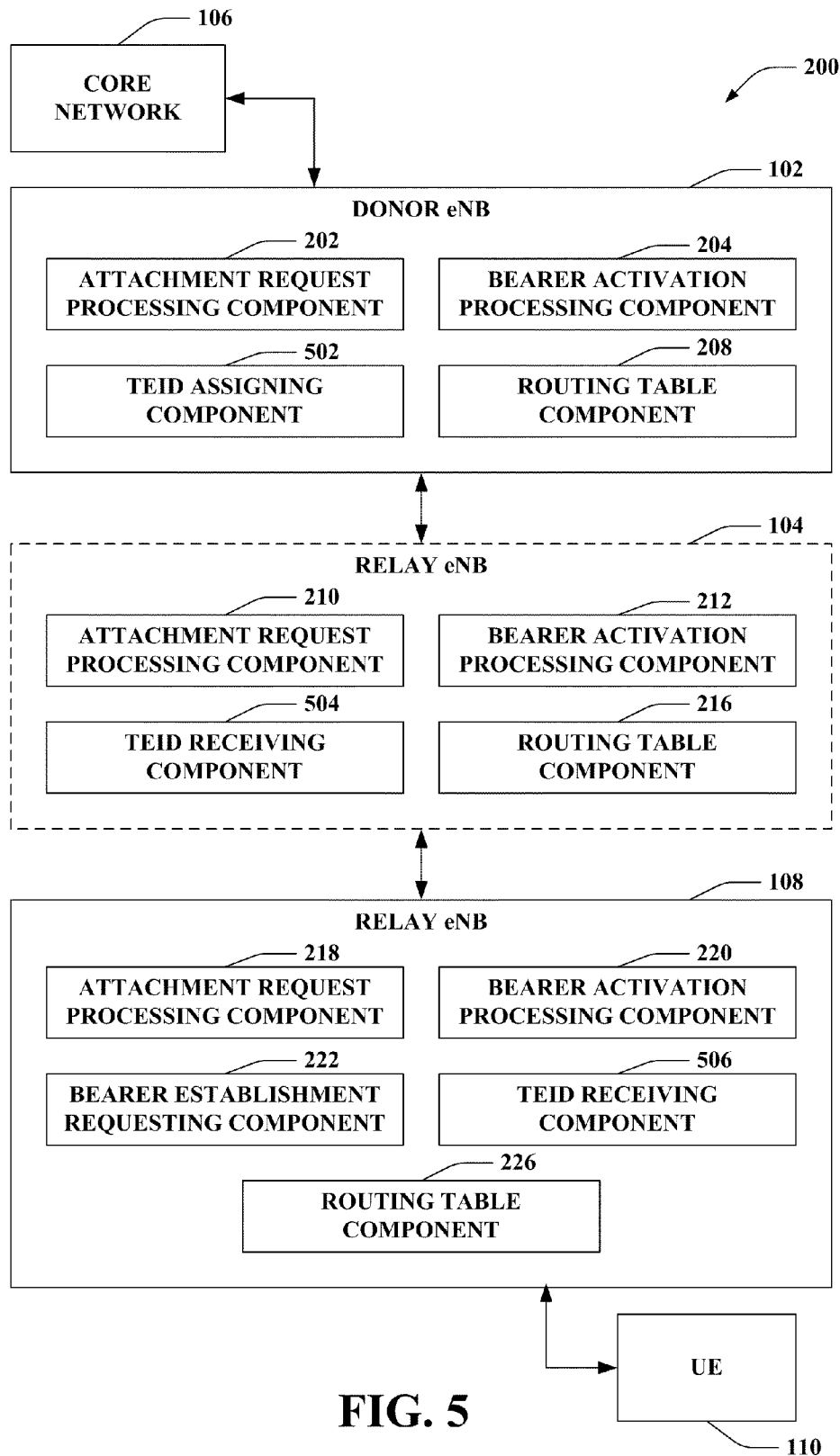
FIG. 5 is an illustration of an example wireless communications system that facilitates assigning a TEID to an established bearer.

Turning now to FIG. 5, an example wireless communication system 500 that facilitates attaching a UE to a wireless network and/or activating dedicated bearers thereof with TEID assignment is illustrated. System 500 includes a donor eNB 102 that provides relay eNB 104 (and/or other relay eNBs) with access to core network 106. Additionally, as described, relay eNB 104 can provide relay eNB 108 with access to the core network 106 through the donor eNB 102. In an example, however, relay eNB 104 may not be present, and relay eNB 108 can communicate directly with donor eNB 102. In a similar example, there can be multiple relay eNBs 104 between the donor eNB 102 and relay eNB 108. In addition, it is to be appreciated that relay eNB 108 can comprise the components of relay eNB 104 and provide similar functionality, in one example. Moreover, donor eNB 102 can be a macrocell access point, femtocell access point, picocell access point, mobile base station, and/or the like. Relay eNBs 104 (and relay eNB 108) can similarly be mobile or stationary relay nodes that communicate with donor eNB 102 (and relay eNB 104) over a wireless or wired backhaul, as described.

Donor eNB 102 comprises an attachment request processing component 202 that receives attachment requests from downstream relay eNBs, forwards the requests to core network 106, and processes request responses, a bearer activation processing component 204 that receives dedicated bearer activation requests from a core network 106 and forwards the requests downstream to facilitate establishing dedicated UE bearers, a TEID assigning component 502 that assigns a TEID for a default or dedicated radio bearer of a UE communicating with a downstream relay eNB, and a routing table component 208 that maintains a routing table associating TEID prefixes to identifiers (e.g., C-RNTI) of related downstream relay eNBs for subsequent packet routing, as well as, for example, a bearer mapping table associating TEIDs with default or dedicated bearer identifiers.

Relay eNB 104 can include an attachment request processing component 210 that forwards network attachment requests to one or more upstream eNBs and processes responses therefrom, a bearer activation processing component 212 that receives dedicated bearer activation requests from an upstream eNB and forwards the requests downstream to facilitate establishing dedicated UE bearers, a TEID receiving component 504 that obtains a TEID for a dedicated or default radio bearer of a UE from donor eNB 102, and a routing table component 216 that stores associations between TEIDs and identifiers (e.g., C-RNTI) of related downstream relay eNBs for subsequent packet routing, as well as, for example, a bearer mapping table associating TEIDs with default or dedicated bearer identifiers.

Relay eNB 108 comprises an attachment request processing component 218 that receives attachment requests from a connected UE and forwards the requests upstream processing responses thereto, a bearer activation processing component 220 that receives dedicated bearer activation requests from upstream eNBs and forwards the requests downstream to facilitate establishing dedicated UE bearers, a bearer establishment requesting component 222 that requests default or dedicated bearer establishment from a connected UE based on an attachment response, a TEID receiving component 506 that obtains a TEID for a default or dedicated radio bearer of UE 110, and a routing table component 226 that associates the TEID suffix to an identifier (e.g., C-RNTI) of the related UE 110 or a default/dedicated radio bearer thereof for subsequent packet routing.

According to an example, UE 110 can request attachment to core network 106 through relay eNB 108. In this example, attachment request processing component 218 can receive the attachment request and forward the request upstream to relay eNB 104, if present. Attachment request processing component 210 can similarly receive and forward the attachment request to donor eNB 102. Attachment request processing component 202 can receive the attachment request and forward to core network 106 for granting or denying. For example, core network 106 can perform authentication/authorization, security procedures, and/or the like for UE 110. Core network 106 can transmit an attachment response to donor eNB 102, such as an attach accept message.

Attachment request processing component 202 can transmit the attach accept to relay eNB 104. Attachment request processing component 210 can receive the attach accept and similarly forward to relay eNB 108 (e.g., based on routing table component 216). Attachment request processing component 218 can receive the attach accept related to UE 110. In addition, TEID assigning component 502 can generate a TEID for UE 110. For example, TEID assigning component 502 can select the TEID from a list of possible TEIDs, generate the TEID based on a specification or configuration, etc. TEID assigning component 502 can transmit the TEID to relay eNB 104, if present, and TEID receiving component 504 can obtain the TEID. TEID receiving component 504 can forward the TEID to relay eNB 108, and TEID receiving component 506 can similarly obtain the TEID.

Bearer establishment requesting component 222 can transmit a bearer establishment request to UE 110 (e.g., an RRC connection reconfiguration or similar message), and can receive a bearer establishment response (e.g., an RRC connection reconfiguration complete or similar message) from UE 110. If the bearer establishment response indicates successful default radio bearer setup, for example, routing table component 226 can store an association between the received TEID, an identifier for the UE 110 (e.g., a C-RNTI and/or the like), and an identifier of the default radio bearer, as described.

Attachment request processing component 218 can transmit an attachment confirmation message, such as an attach complete, to relay eNB 104. In one example, attachment request processing component 218 can include an identifier of the default radio bearer for UE 110 in the attach complete. Attachment request processing component 210 can obtain the attach complete, and routing table component 216 can similarly store an association between the TEID and the next downstream relay eNB to UE 110, which is relay eNB 108, in this example. Additionally, routing table component 216 can store an association between the TEID and the identifier for the default radio bearer in a bearer mapping table. Attachment request processing component 210 can forward the attach complete to donor eNB 102. Attachment request processing component 202 can similarly receive the attach complete, and routing table component 208 can store the TEID in a routing table along with an identifier of the next downstream relay eNB to UE 110, which is relay eNB 104, in this example. Moreover, for example, routing table component 208 can similarly store an association between the TEID and the identifier for the default radio bearer in a bearer mapping table. Subsequently, UE 110 can transmit communications to relay eNB 108, which can add the TEID to the message to facilitate subsequent routing of response packets received from core network 106.

As described, similar functionality can be provided for dedicated bearer activation. Thus, for example, bearer activation processing component 204 can receive a request for dedicated bearer activation for UE 110 from core network 106. Bearer activation processing component 204 can forward the bearer setup request downstream to relay eNB 104. Bearer activation processing component 212 can similarly receive and forward the bearer setup request to relay eNB 108. Bearer activation processing component 220 can receive the bearer setup request. Similarly to the attachment procedure, TEID assigning component 502 can generate a TEID for the dedicated bearer and transmit the TEID assignment to relay eNB 104. TEID receiving component 504 can obtain the TEID and forward the assignment to relay eNB 108. TEID receiving component 506 can receive the TEID assignment.

Bearer establishment requesting component 222 can transmit a bearer establishment request message to UE 110 for the dedicated bearer, and can receive a response message from UE 110. If bearer establishment requesting component 222 receives a successful bearer establishment message from UE 110, routing table component 226 can store the received TEID along with a UE 110 identifier and/or an identifier of the dedicated radio bearer for subsequent packet routing, as described. Bearer activation processing component 220 can transmit a bearer setup complete message to relay eNB 104. Bearer activation processing component 212 can receive the bearer setup complete message. As described previously, routing table component 216 can store an entry in the routing table associating the received TEID to the next downstream relay eNB in a communication path to UE 110, which is relay eNB 108. Additionally, routing table component 216 can store an association of the TEID to the identifier of the UE dedicated bearer identifier in a bearer mapping table. Bearer activation processing component 212 can transmit the bearer setup complete message to donor eNB 102. Bearer activation processing component 204 can similarly receive the bearer setup complete message. As described previously, routing table component 208 can store entries relating to the TEID in the routing table and bearer mapping table.

Figure 6:
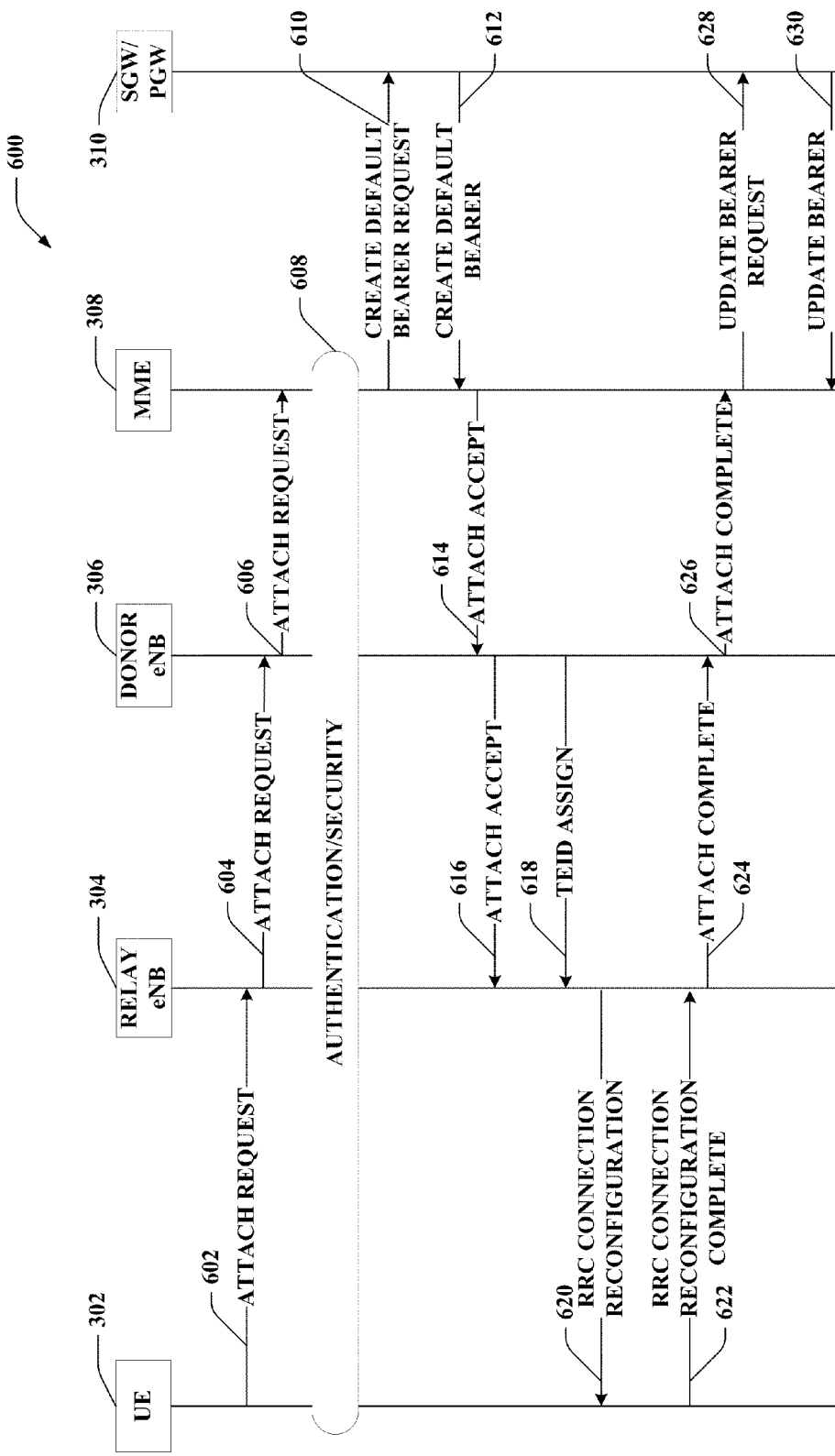
FIG. 6 is an illustration of an example wireless communications system that attaches a device to a network and assigns a TEID for a default bearer thereof.

Referring to FIG. 6, an example wireless communication system 600 for attaching to a wireless network through one or more cell relays and receiving TEID assignment is illustrated. System 600 includes a UE 302 that communicates with a relay eNB 304 to receive access to a wireless network. Relay eNB 304 communicates with a donor eNB 306, as described, to receive access to network components. The wireless network components depicted include an MME 308 and SGW/PGW 310. As shown, UE 302 can transmit an attach request 602 to relay eNB 304. It is to be appreciated that UE 302 can have initially received communication resources from relay eNB 304 (e.g., via random access procedure, RRC Connection Setup messages, etc.).

Relay eNB 304, in one example, can derive an MME from a globally unique temporary identifier (GUTI) in the attach request. If the MME is not association with relay eNB 304, it can select MME 308 based at least in part on an MME selection function. Relay eNB 304 can forward the attach request 604 to donor eNB 306, which can forward the attach request 606 to MME 308. In response, MME 308 can initiate authentication/security procedures 608 with UE 302 to ensure it is authorized to access the wireless network. This can include, for example, exchanging messages among various core network components, such as MME 308, SGW/PGW 310, policy charging and rules function (PCRF), home subscriber service (HSS), etc.

Once MME 308 determines that UE 302 is authorized and/or determines the appropriate SGW/PGW (e.g., based on a disparate selection function), it can allocate an EPS bearer identifier for the default bearer and initiate a create default bearer request 610 to SGW/PGW 310. SGW/PGW 310 can create the default bearer and transmit a create default bearer 612 to MME 308. MME 308 can accordingly transmit an attach accept 614 to donor eNB 306. It is to be appreciated that where the MME allocates a new GUTI, the GUTI can be included in the attach accept 614. In addition, the attach accept 614 can include QoS information for setting up the radio bearer at the UE 302, a TEID at the SGW/PGW 310, and/or an address of the SGW/PGW 310. Donor eNB 306 can forward the attach accept 616 to relay eNB 304, e.g., based on locating the relay eNB 304 as relating to the attach accept 614 in a routing table as described. In addition, donor eNB 306, as described, can create a TEID for UE 302 and/or its default bearer and can transmit a TEID assign 618 to relay eNB 304. Relay eNB 304 can transmit an RRC connection reconfiguration 620 to UE 302 to facilitate establishing a default radio bearer for communication from UE 302. UE 302 can initialize the default radio bearer and transmit an RRC connection reconfiguration complete 622 to relay eNB 304, which can include an attach complete message generated by UE 302.

As described, relay eNB 304, upon receiving the RRC connection reconfiguration complete 622, can store the TEID in a routing table along with identifiers for UE 302 and/or the dedicated bearer. Relay eNB 304 can transmit the attach complete message from the RRC connection reconfiguration complete, attach complete 624, to donor eNB 306. Donor eNB 306 can store the TEID with an identifier of relay eNB 304 to facilitate subsequent packet routing, and/or an identifier of the default radio bearer of UE 302, in a routing table. Donor eNB can forward the attach complete 626 to MME 308. Upon receiving the attach complete 626, MME 308 can transmit an update bearer request 628 to SGW/PGW 310, and SGW/PGW 610 can acknowledge the update bearer request 628 with an update bearer response 630 to MME 308.

Figure 7:
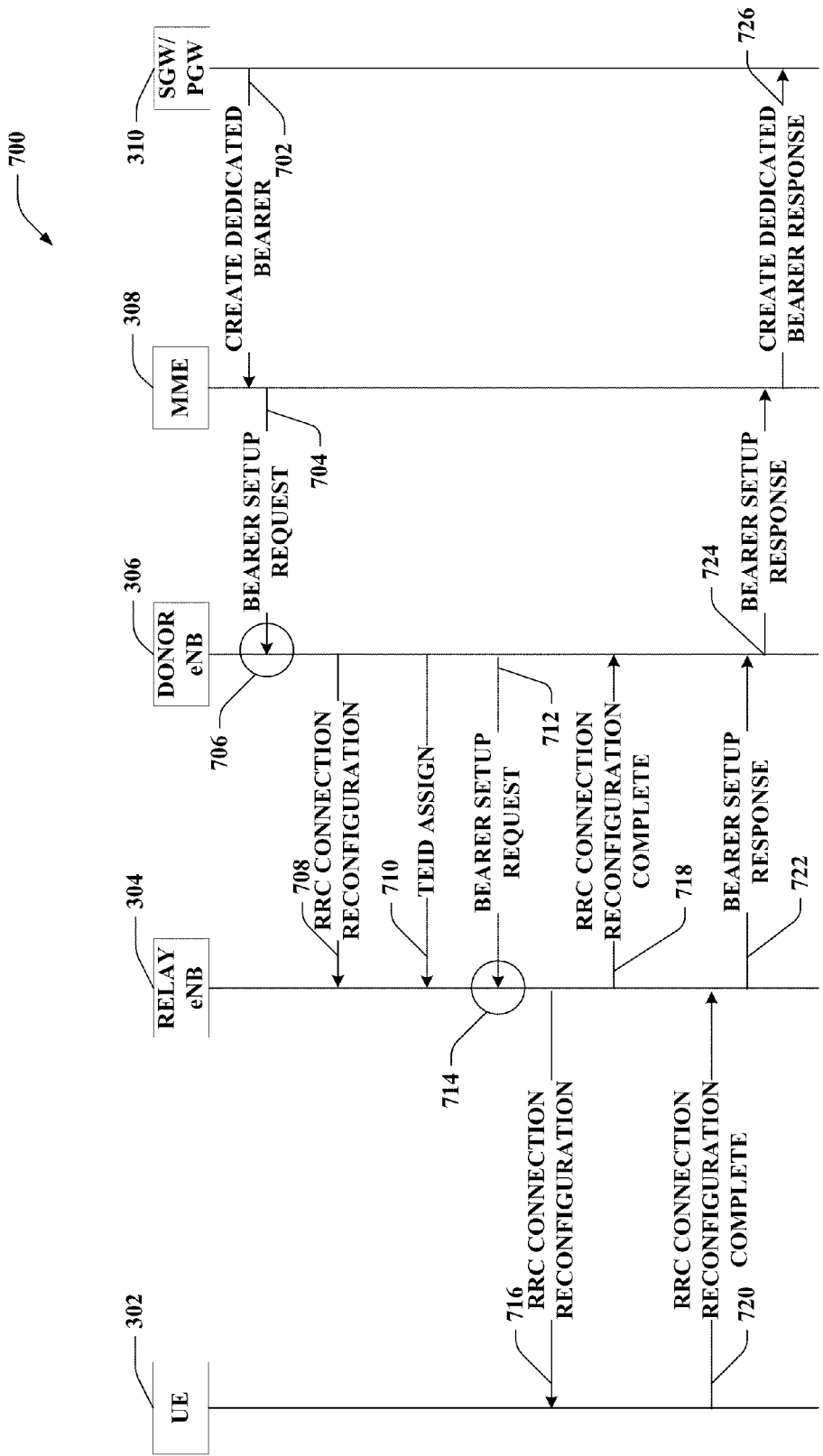
FIG. 7 is an illustration of an example wireless communications system that activates a device dedicated bearer and assigns a TEID for the bearer.

Referring to FIG. 7, an example wireless communication system 700 for activating dedicated bearers through one or more cell relays and receiving TEID assignments for the bearers is illustrated. System 700 includes a UE 302 that communicates with a relay eNB 304 to receive access to a wireless network. Relay eNB 304 communicates with a donor eNB 306, as described, to receive access to network components. The wireless network components depicted include an MME 308 and SGW/PGW 310. As shown, SGW/PGW 310 can transmit a create dedicated bearer 702 to MME 308, which can include bearer QoS parameters, SGW TEID, etc., to facilitate activating a UE dedicated bearer. MME 308 can accordingly transmit a bearer setup request 704 to donor eNB 306, which can include an EPS bearer identifier selected by MME 308 (which has not been assigned to UE 302), the bearer QoS, session management configuration information, SGW TEID, and/or the like. Donor eNB 306 can perform admission control 706 or other QoS procedure to determine resource allocation based on bandwidth, latency, and/or the like, for example.

Donor eNB 306 can transmit an RRC connection reconfiguration 708 to relay eNB 304. For example, if there is a maximum number of data radio bearers limitation, donor eNB 306 can establish a radio bearer that maps the EPS bearer. Alternatively, if radio bearers are pre-established, donor eNB 306 can map the EPS bearer to the appropriate bearer of relay eNB 304 sending the RRC connection reconfiguration with updated QoS parameters. If radio bearers are not pre-established, donor eNB 306 can send the RRC connection reconfiguration to the relay eNB 304 to establish a radio bearer that maps to the EPS bearer. In any case, donor eNB 306 can additionally transmit a TEID assignment 710 for the dedicated radio bearer to relay eNB 304. Moreover, donor eNB 306 can transmit the bearer setup request 712 to relay eNB 304. Relay eNB 304 can additionally perform admission control 714. Relay eNB 304 can transmit an RRC connection reconfiguration complete 718 to donor eNB 306 to acknowledge radio bearer activation.

Relay eNB 304 can similarly transmit an RRC connection reconfiguration 716 to UE 302 that maps the EPS bearer. UE 302 can acknowledge the dedicated radio bearer activation be transmitting an RRC connection reconfiguration complete 720 to relay eNB 304. Relay eNB 304 can store the received TEID along with an association to UE 302 and/or the dedicated radio bearer thereof in a routing table, as described, and can transmit a bearer setup response 722, to donor eNB 306. Donor eNB 306 can store the TEID with an identifier of relay eNB 304 to facilitate subsequent packet routing, and/or an identifier of the default radio bearer of UE 302, in a routing table. Donor eNB 306 can forward the bearer setup response 724 to MME 308. Upon receiving the bearer setup response 724, MME 308 can transmit a create dedicated bearer response 726 to SGW/PGW 310 indicating whether the dedicated bearer is activated.

It is to be appreciated, for example, that admission control 706 or 714 can be unsuccessful, in which case the respective bearer setup response 724 or 722 can indicate such. In this example, if admission control 714 fails, donor eNB 306 can transmit a connection reverse message, such as RRC connection reconfiguration reverse, to relay eNB 304, which can respond with a connection reverse complete message. In addition, donor eNB 306 can transmit a TEID assign reverse message to relay eNB 304 to cancel the TEID assignment, and relay eNB 304 can send a response message, in one example.

Figure 8:
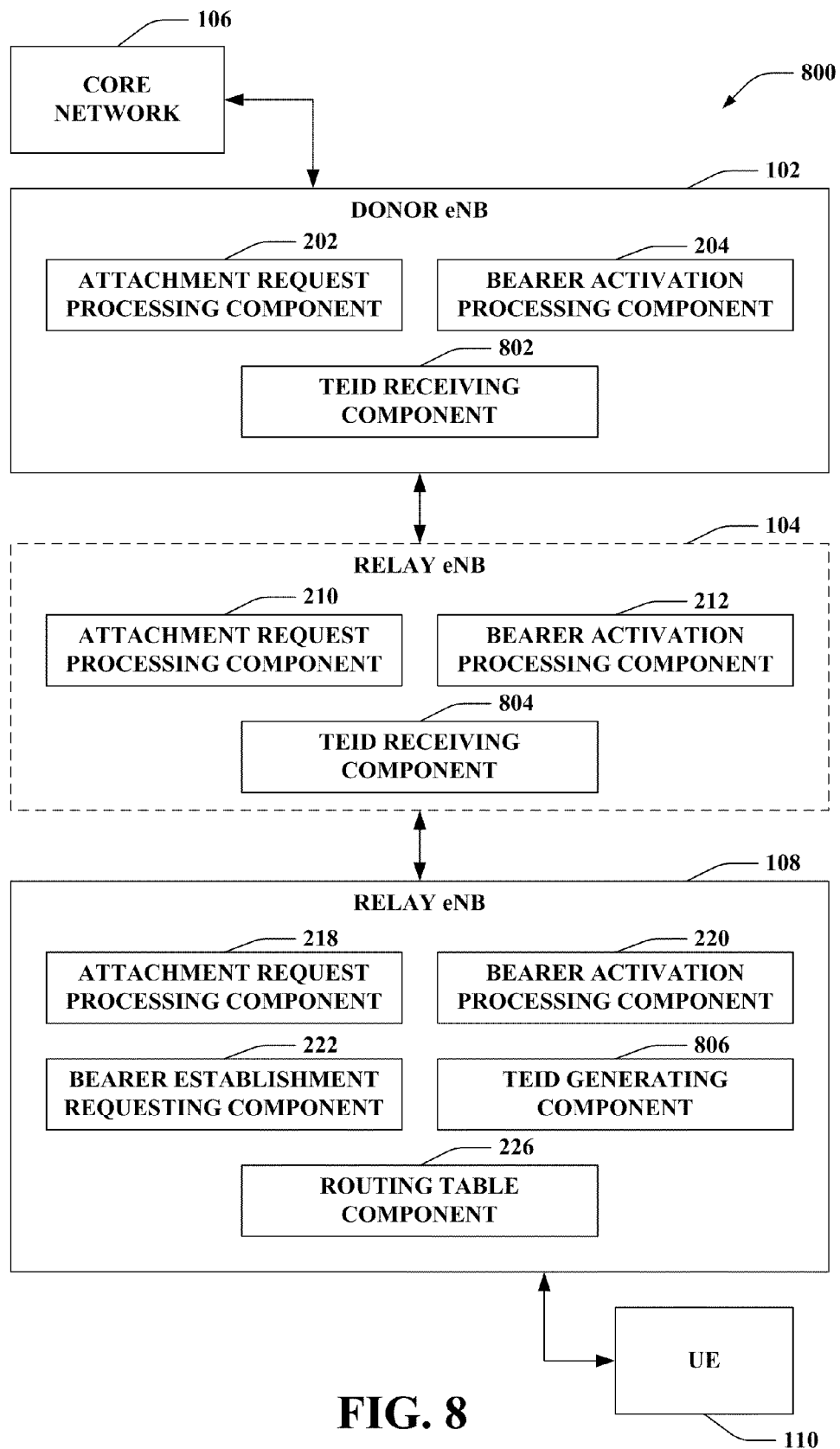
FIG. 8 is an illustration of an example wireless communications system that facilitates establishing a bearer for a device and generating a local TEID for the bearer.

Turning now to FIG. 8, an example wireless communication system 800 that facilitates attaching a UE to a wireless network and/or activating dedicated bearers thereof via cell relay utilizing a relay protocol for network communications is illustrated. System 800 includes a donor eNB 102 that provides relay eNB 104 (and/or other relay eNBs) with access to core network 106. Additionally, as described, relay eNB 104 can provide relay eNB 108 with access to the core network 106 through the donor eNB 102. In an example, however, relay eNB 104 may not be present, and relay eNB 108 can communicate directly with donor eNB 102. In a similar example, there can be multiple relay eNBs 104 between the donor eNB 102 and relay eNB 108. In addition, it is to be appreciated that relay eNB 108 can comprise the components of relay eNB 104 and provide similar functionality, in one example. Moreover, donor eNB 102 can be a macrocell access point, femtocell access point, picocell access point, mobile base station, and/or the like. Relay eNBs 104 (and relay eNB 108) can similarly be mobile or stationary relay nodes that communicate with donor eNB 102 (and relay eNB 104) over a wireless or wired backhaul, as described.

Donor eNB 102 comprises an attachment request processing component 202 that receives attachment requests from downstream relay eNBs, forwards the requests to core network 106, and processes request responses, a bearer activation processing component 204 that receives dedicated bearer activation requests from a core network 106 and forwards the requests downstream to facilitate establishing default or dedicated UE bearers, and a TEID receiving component 802 that obtains a TEID from a downstream relay eNB and inserts the TEID in a bearer mapping table with an identifier of a related downstream bearer.

Relay eNB 104 can include an attachment request processing component 210 that forwards network attachment requests to one or more upstream eNBs and processes responses therefrom, a bearer activation processing component 212 that receives dedicated bearer activation requests from an upstream eNB and forwards the requests downstream to facilitate establishing default or dedicated UE bearers, and a TEID receiving component 804 that obtains a TEID from a downstream relay eNB, inserts the TEID in a bearer mapping table with an identifier of a related downstream bearer, and provides the TEID to one or more upstream nodes.

Relay eNB 108 comprises an attachment request processing component 218 that receives attachment requests from a connected UE and forwards the requests upstream processing responses thereto, a bearer activation processing component 220 that receives dedicated bearer activation requests from upstream eNBs and forwards the requests downstream to facilitate establishing dedicated UE bearers, a bearer establishment requesting component 222 that requests default or dedicated bearer establishment from a connected UE based on an attachment response, a TEID generating component 806 that creates a TEID for a default or dedicated radio bearer of UE 110, and a routing table component 226 that associates the TEID to an identifier (e.g., C-RNTI) of the related UE 110 or a default/dedicated radio bearer thereof for subsequent packet routing.

According to an example, relay eNB 108 can have previously attached to the core network 106 via relay eNB 104 and donor eNB 102 (which can also have previously attached). In this regard, donor eNB 102 and/or relay eNB 104 can have generated a relay identifier for relay eNB 108 to facilitate routing packets thereto utilizing a relay protocol. UE 110 can request attachment to core network 106 through relay eNB 108. In this example, attachment request processing component 218 can receive the attachment request and forward the request upstream to relay eNB 104, if present. Attachment request processing component 210 can similarly receive the forward the attachment request to donor eNB 102. Attachment request processing component 202 can receive the attachment request and forward to core network 106 for granting or denying. For example, core network 106 can perform authentication/authorization, security procedures, and/or the like for UE 110. Core network 106 can transmit an attachment response to donor eNB 102, such as an attach accept message.

Attachment request processing component 202 can transmit the attach accept to relay eNB 104, if present. Attachment request processing component 210 can receive the attach accept and similarly forward to relay eNB 108. Attachment request processing component 218 can receive the attach accept related to UE 110. In one example, attachment request processing component 218 can request transport address translation from donor eNB 102 via relay eNB 104. Bearer establishment requesting component 222 can transmit a bearer establishment request to UE 110 (e.g., an RRC connection reconfiguration or similar message), and can receive a bearer establishment response (e.g., an RRC connection reconfiguration complete or similar message) from UE 110. If the bearer establishment response indicates successful default radio bearer setup, for example, TEID generating component 806 can create a TEID for the default radio bearer. It is to be appreciated that this can be performed before receiving the bearer establishment response, in one example. Routing table component 226 can store an association between the TEID, an identifier for the UE 110 (e.g., a C-RNTI and/or the like), and an identifier of the default radio bearer, as described.

Attachment request processing component 218 can transmit an attachment confirmation message, such as an attach complete, to relay eNB 104, if present. In one example attachment request processing component 218 can include the TEID and/or an identifier of UE 110 and/or default radio bearer in the attach complete. Attachment request processing component 210 can obtain the attach complete. TEID receiving component 804 can obtain the TEID and store it in a bearer mapping table along with an identifier of the UE 110 and/or default radio bearer (which can also be extracted from the attach complete). Attachment request processing component 210 can forward the attach complete to donor eNB 102. Similarly, attachment request processing component 202 can obtain the attach complete. TEID receiving component 802 can obtain the TEID and store it in a bearer mapping table along with an identifier of the UE 110 and/or default radio bearer (which can also be extracted from the attach complete).

Subsequently, UE 110 can transmit communications to relay eNB 108, which can add the TEID to the message to facilitate subsequent routing of response packets received from core network 106. For example, UE 110 can provide data to relay eNB 108 for transmitting to core network 106. Relay eNB 108 can package the data in a tunneling protocol packet along with the TEID. Furthermore, relay eNB 108 can create a relay protocol packet including the tunneling protocol packet as data and inserting a relay identifier for relay eNB 108 in the header. Relay eNB 108 can transmit the relay protocol packet to relay eNB 104, if present, which can forward it to donor eNB 102.

Donor eNB 102 can terminate the relay protocol and transmit the tunneling protocol packet to core network 106. Core network 106 can issue a responding tunneling protocol packet, and donor eNB 102 can create a relay protocol packet with the responding tunneling protocol packet as the data and insert the relay identifier for relay eNB 108 in the header. Using a routing table, as described, donor eNB 102 can route the packet to relay eNB 104, if present or otherwise relay eNB 108, based on the relay identifier, and relay eNB 104 can similarly route the packet to relay eNB 108 based on the relay identifier. Relay eNB 108 can terminate the relay protocol and process the response tunneling protocol packet. Routing table component 226 can determine to route the packet to UE 110 based on locating the TEID in response tunneling protocol packet, for example.

As described, similar functionality can be provided for dedicated bearer activation. Thus, for example, bearer activation processing component 204 can receive a request for dedicated bearer activation for UE 110 from core network 106 and can forward the bearer setup request downstream to relay eNB 104. Bearer activation processing component 212 can similarly receive and forward the bearer setup request to relay eNB 108. Bearer activation processing component 220 can receive the bearer setup request, and bearer establishment requesting component 222 can transmit a bearer establishment request message to UE 110 for the dedicated bearer, and can receive a response message from UE 110.

As described in the context of attachment procedure, if bearer establishment requesting component 222 receives a successful bearer establishment message from UE 110, TEID generating component 806 can create a TEID for the dedicated bearer, and routing table component 226 can store the TEID along with a UE 110 identifier and/or an identifier of the dedicated radio bearer for subsequent packet routing, as described. Bearer activation processing component 220 can transmit a bearer setup complete message to relay eNB 104. Bearer activation processing component 212 can receive the bearer setup complete message, which can include a TEID and/or other identifiers, and TEID receiving component 804 can obtain the TEID and/or other identifiers and store them in a bearer mapping table. Bearer activation processing component 212 can transmit the bearer setup complete message to donor eNB 102. Bearer activation processing component 204 can similarly receive the bearer setup complete message, and TEID receiving component 802 can similarly store identifiers in the message in a bearer mapping table.

Figure 9:
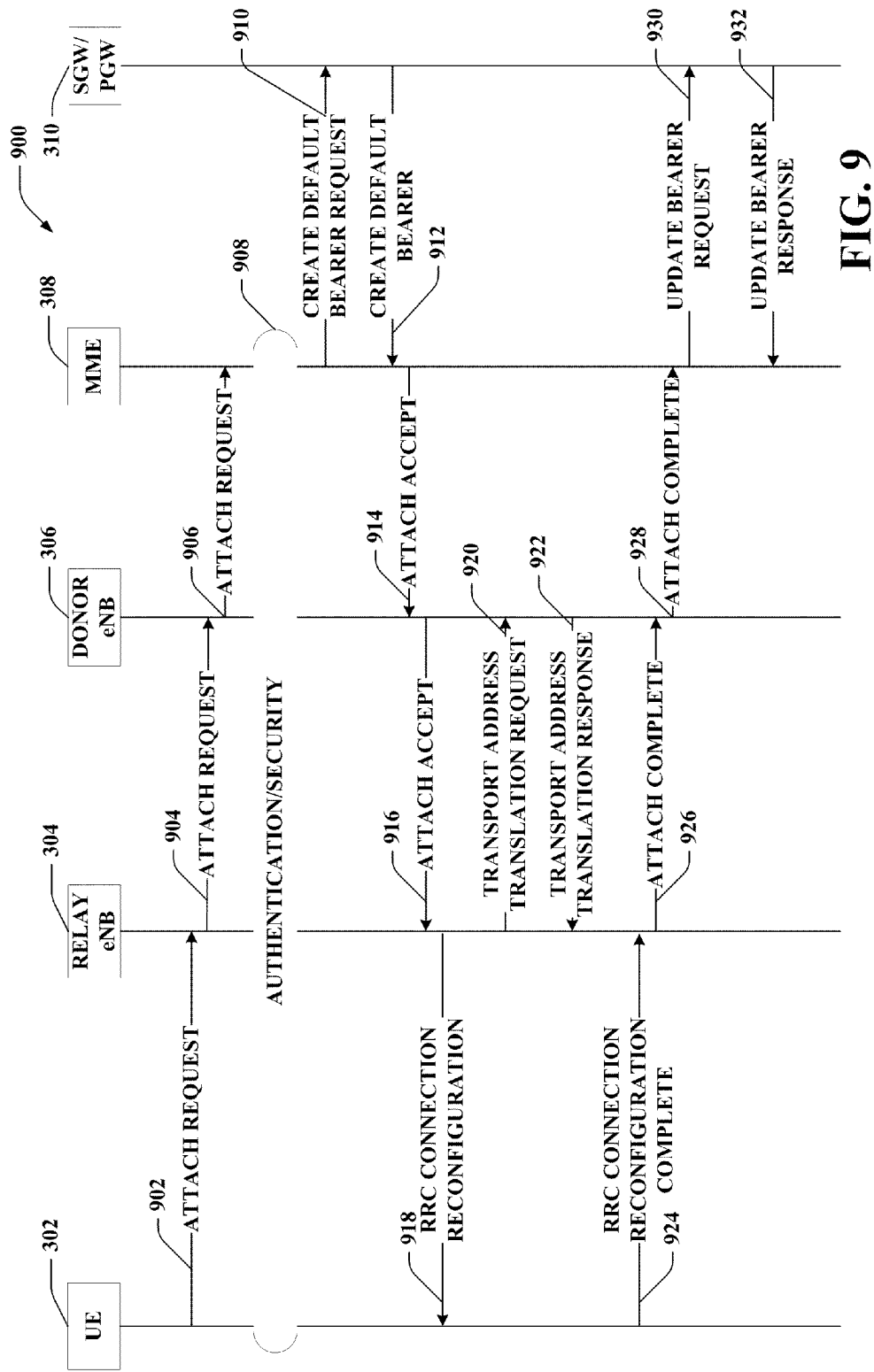
FIG. 9 is an illustration of an example wireless communications system that attaches a device to a network and generates a local TEID for the bearer.

Referring to FIG. 9, an example wireless communication system 900 for attaching to a wireless network through one or more cell relays that use a relay protocol for network communications is illustrated. System 900 includes a UE 302 that communicates with a relay eNB 304 to receive access to a wireless network. Relay eNB 304 communicates with a donor eNB 306, as described, to receive access to network components. The wireless network components depicted include an MME 308 and SGW/PGW 310. As shown, UE 302 can transmit an attach request 902 to relay eNB 304. It is to be appreciated that UE 302 can have initially received communication resources from relay eNB 304 (e.g., via random access procedure, RRC Connection Setup messages, etc.).

Relay eNB 304, in one example, can derive an MME from a globally unique temporary identifier (GUTI) in the attach request. If the MME is not association with relay eNB 304, it can select MME 308 based at least in part on an MME selection function. Relay eNB 304 can forward the attach request 904 to donor eNB 306, which can forward the attach request 906 to MME 308. In response, MME 308 can initiate authentication/security procedures 908 with UE 302 to ensure it is authorized to access the wireless network. This can include, for example, exchanging messages among various core network components, such as MME 308, SGW/PGW 310, policy charging and rules function (PCRF), home subscriber service (HSS), etc.

Once MME 308 determines that UE 302 is authorized and/or determines the appropriate SGW/PGW (e.g., based on a disparate selection function), it can allocate an EPS bearer identifier for the default bearer and initiate a create default bearer request 910 to SGW/PGW 310. SGW/PGW 310 can create the default bearer and transmit a create default bearer 912 to MME 308. MME 308 can accordingly transmit an attach accept 914 to donor eNB 306. It is to be appreciated that where the MME allocates a new GUTI, the GUTI can be included in the attach accept 914. In addition, the attach accept 914 can include QoS information for setting up the radio bearer at the UE 302, a TEID at the SGW/PGW 310, and/or an address of the SGW/PGW 310. Donor eNB 306 can forward the attach accept 916 to relay eNB 304. Relay eNB 304 can transmit an RRC connection reconfiguration 918 to UE 302 to facilitate establishing a default radio bearer for communication from UE 302. As described previously, relay eNB 304 can transmit a transport address translation request 920 to donor eNB 306 to establish an identifier for an address over SGW/PGW 310. Donor eNB 306 can transmit a transport address translation response 922 to relay eNB 304 indicating translation information, as described. UE 302 can initialize the default radio bearer and transmit an RRC connection reconfiguration complete 924 to relay eNB 304, which can include an attach complete message generated by UE 302.

Relay eNB 304 can generate a TEID for the default radio bearer of UE 302, as described, to facilitate subsequent packet routing of a tunneling protocol packet to UE 302. Relay eNB 304 can transmit the attach complete message from the RRC connection reconfiguration complete, attach complete 926, to donor eNB 306. Donor eNB can forward the attach complete 928 to MME 308. Upon receiving the attach complete 928, MME 308 can transmit an update bearer request 930 to SGW/PGW 310, and SGW/PGW 310 can acknowledge the update bearer request 930 with an update bearer response 932 to MME 308.

Figure 10:
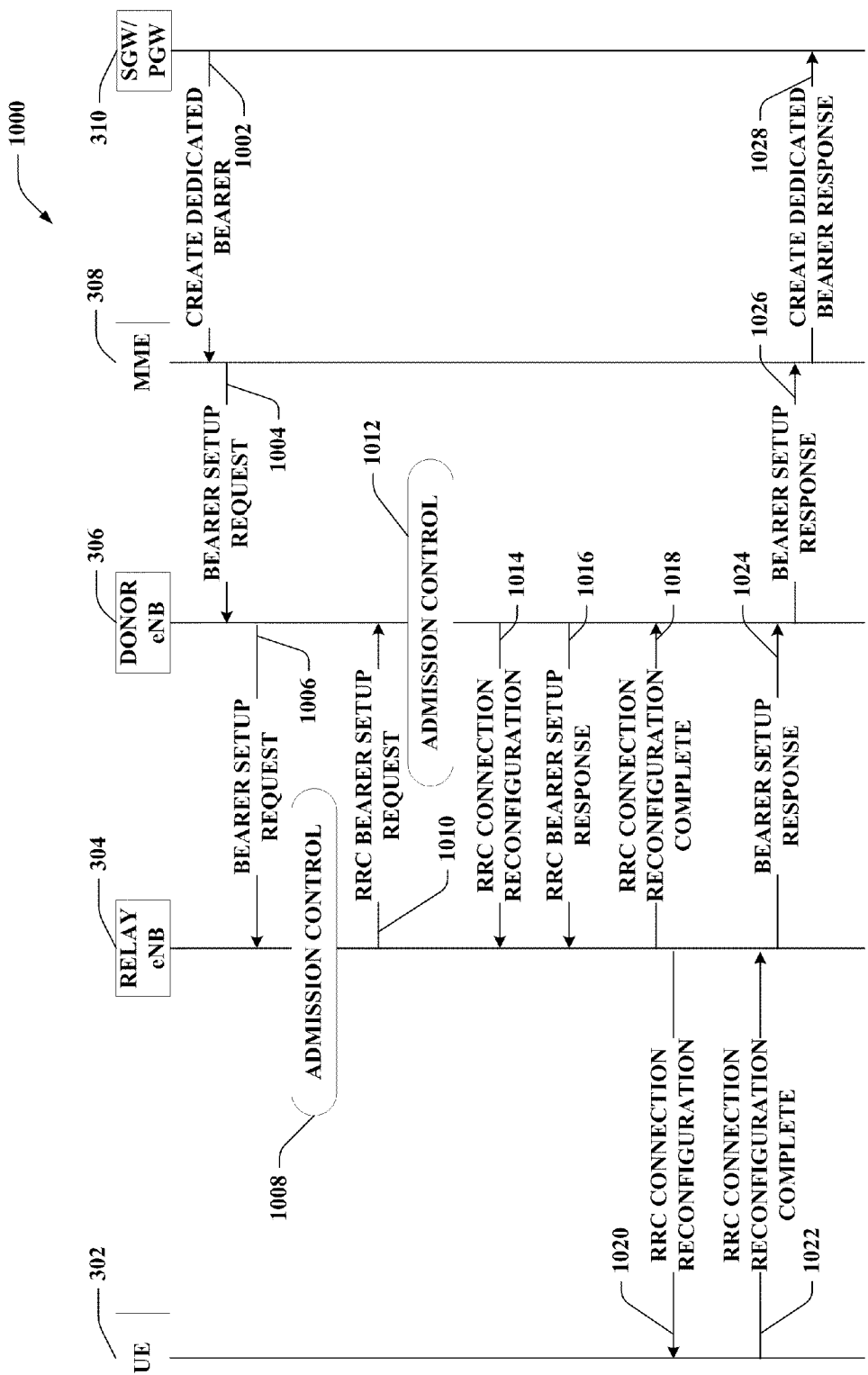
FIG. 10 is an illustration of an example wireless communications system that activates a device dedicated bearer and assigns a local TEID for the bearer.

Referring to FIG. 10, an example wireless communication system 1000 for activating dedicated bearers through one or more cell relays that utilize a relay protocol for network communications is illustrated. System 1000 includes a UE 302 that communicates with a relay eNB 304 to receive access to a wireless network. Relay eNB 304 communicates with a donor eNB 306, as described, to receive access to network components. The wireless network components depicted include an MME 308 and SGW/PGW 310. As shown, SGW/PGW 310 can transmit a create dedicated bearer 1002 to MME 308, which can include bearer QoS parameters, SGW TEID, etc., to facilitate activating a UE dedicated bearer. MME 308 can accordingly transmit a bearer setup request 1004 to donor eNB 306, which can include an EPS bearer identifier selected by MME 308 (which has not been assigned to UE 302), the bearer QoS, session management configuration information, SGW TEID, and/or the like.

Donor eNB 306 can forward the bearer setup request 1006 to relay eNB 304. Relay eNB 304 can perform admission control 1008 or other QoS procedure to determine resource allocation based on bandwidth, latency, and/or the like, for example, and can send an RRC bearer setup request 1010 to donor eNB 306 (e.g., to modify one or more QoS characteristics therewith). Donor eNB 306 can also perform admission control 1012. Donor eNB 306 can transmit an RRC connection reconfiguration 1014 to relay eNB 304. For example, if there is a maximum number of data radio bearers limitation, donor eNB 306 can establish a radio bearer that maps the EPS bearer. Alternatively, if radio bearers are pre-established, donor eNB 306 can map the EPS bearer to the appropriate bearer of relay eNB 304 sending the RRC connection reconfiguration with updated QoS parameters. If radio bearers are not pre-established, donor eNB 306 can send the RRC connection reconfiguration to the relay eNB 304 to establish a radio bearer that maps to the EPS bearer. In any case, donor eNB 306 can additionally transmit an RRC bearer setup response 1016 to relay eNB 304. Relay eNB 304 can transmit an RRC connection reconfiguration complete 1018 to donor eNB 306 to acknowledge radio bearer activation.

Relay eNB 304 can similarly transmit an RRC connection reconfiguration 1020 to UE 302 that maps the EPS bearer. UE 302 can acknowledge the dedicated radio bearer activation be transmitting an RRC connection reconfiguration complete 1022 to relay eNB 304. Relay eNB 304 can accordingly transmit a bearer setup response 1024, to donor eNB 306. Donor eNB 306 can forward the bearer setup response 1026 to MME 308. Upon receiving the bearer setup response 1026, MME 308 can transmit a create dedicated bearer response 1028 to SGW/PGW 310 indicating whether the dedicated bearer is activated. Thus, in this example, donor eNB 306 forwards the bearer setup request 1006 in a relay protocol having the bearer setup request 1004 as data and a relay identifier of relay eNB 304 in the header. In this regard, donor eNB 306 need not determine contents of the packet from MME 308, and relay eNB 304 requests RRC bearer setup 1010 once determining that the received message is bearer setup request 1006.

It is to be appreciated, for example, that admission control 1008 or 1012 can be unsuccessful, in which case the respective bearer setup response 1024 or 1026 can indicate such. In this example, if admission control 1012 fails, donor eNB 306 can not transmit RRC connection reconfiguration 1014 and can transmit the failed admission control status in RRC bearer setup response 1016. In this example, relay eNB 304 can not transmit RRC connection reconfiguration 1020 since admission control failed and can indicate the failure in bearer setup response 1024. For example, donor eNB 306 can also include the failure in bearer setup response 1026, and MME 308 can indicate failure in the create dedicated bearer response 1028.

Figure 11:
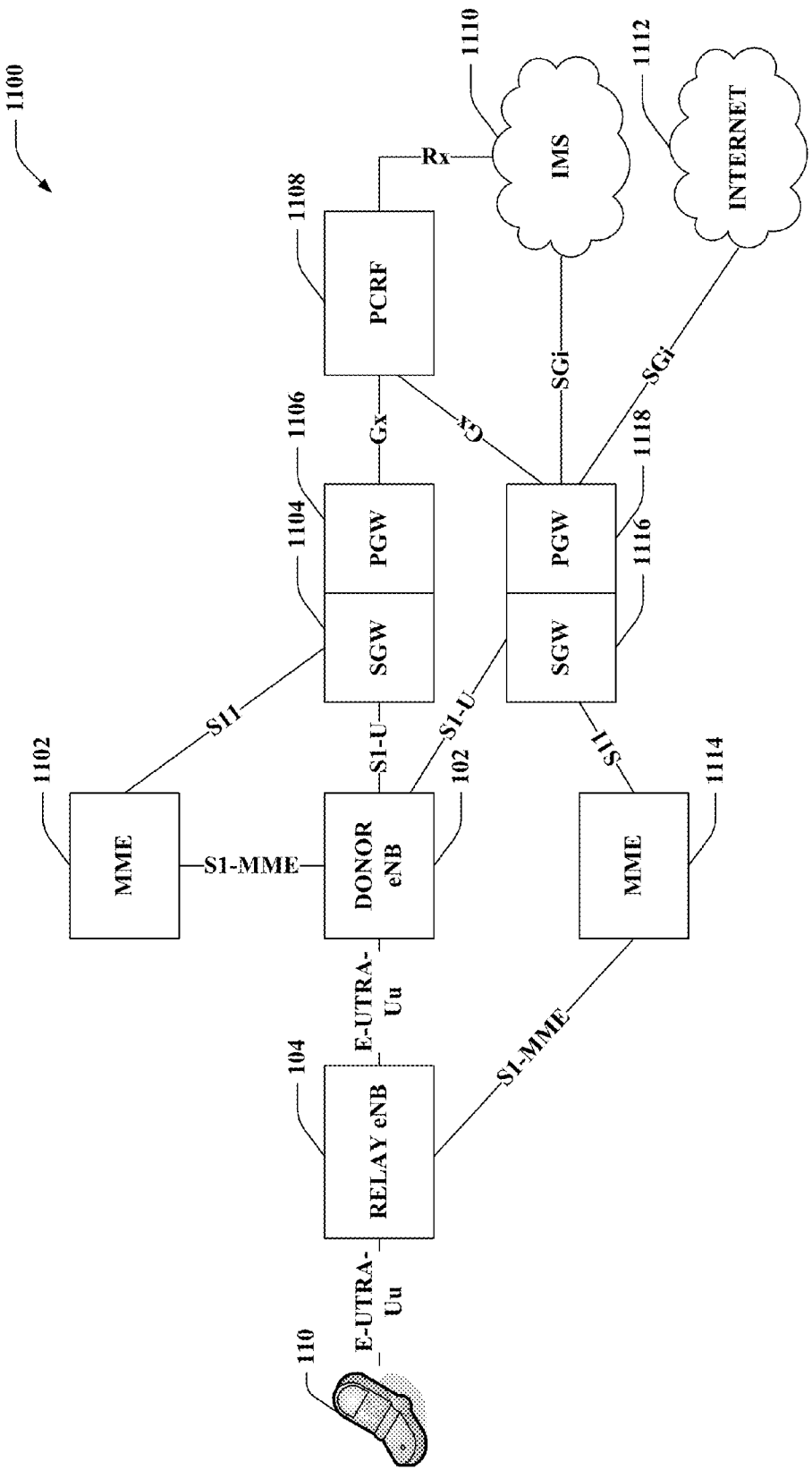
FIG. 11 is an illustration of an example wireless communications system that utilizes cell relays to provide access to a wireless network.

Now turning to FIG. 11, an example wireless communication network 1100 that provides cell relay functionality is depicted. Network 1100 includes a UE 110 that communicates with a relay eNB 104, as described, to receive access to a wireless network. Relay eNB 104 can communicate with a donor eNB 102 using a relay protocol to provide access to a wireless network, and as described, donor eNB 102 can communicate with an MME 1102 and/or SGW 1104 that relate to the relay eNB 104. SGW 1104 can connect to or be coupled with a PGW 1106, which provides network access to SGW 1104 and/or additional SGWs. PGW 1106 can communicate with a PCRF 1108 to authenticate/authorize UE 110 to use the network, which can utilize an IMS 1110 to provide addressing to the UE 110 and/or relay eNB 104.

According to an example, MME 1102 and/or SGW 1104 and PGW 1106 can be related to donor eNB 102 serving substantially all relay eNBs in the cluster. Donor eNB 102 can also communicate with an SGW 1116 and PGW 1118 that relate to the UE 110, such that the PGW 1118 can assign UE 110 a network address to facilitate tunneling communications thereto through the relay eNB 104, donor eNB 102, and SGW 1116. Moreover, for example, SGW 1116 can communicate with an MME 1114 to facilitate control plane communications to and from the UE 110. It is to be appreciated that MME 1102 and MME 1114 can be the same MME, in one example. PGW 1118 can similarly communicate with a PCRF 1108 to authenticate/authorize UE 110, which can communicate with an IMS 1110. In addition, PGW 1118 can communicate directly with the IMS 1110 and/or internet 1112.

In an example, UE 110 can communicate with the relay eNB 104 over an E-UTRA-Uu interface, as described, and the relay eNB 104 can communicate with the donor eNB 102 using an E-UTRA-Uu interface or other interface using the relay protocol, as described herein. Donor eNB 102 communicates with the MME 1102 using an S1-MME interface and the SGW 1104 and PGW 1106 over an S1-U interface, as depicted. In one example, as described, communications received from relay eNB 104 for MME 1102 or SGW 1104/PGW 1106 can be over a relay protocol and can have an IP address of MME 1102 or SGW 1104/PGW 1106 in the relay protocol header. Donor eNB 102 can appropriately route the packet according to the IP address and/or payload type of the relay protocol. In another example, packets from relay eNB 104 can comprised a previously assigned TEID or portion thereof. In addition, the transport layers used over the S1-MME and S1-U interfaces are terminated at the donor eNB 102, as described. In this regard, upon receiving communications for the relay eNB 104 from the MME 1102 or SGW 1104, donor eNB 102 can, for example, decouple the application layer from the transport layer by defining a new relay protocol packet, or other protocol layer packet, and transmitting the application layer communication to the relay eNB 104 in the new protocol packet (over the E-UTRA-Uu interface, in one example). Donor eNB 102 can transmit the packet to relay eNB 104 (and/or one or more disparate relay eNBs as described) based on a TEID in the packet or relay identifier in the header.

Upon transmitting control plane communications from the relay eNB 104 to the MME 1102, donor eNB 102 can indicate an identifier of the relay eNB 104 (e.g., in an S1-AP message), and MME 1102 can transmit the identifier in responding communications to the donor eNB 102. When transmitting data plane communications from relay eNB 104 to SGW 1104, donor eNB 102 can insert an identifier for the relay eNB 104 (or UE 110 or one or more related bearers) in the TEID of a GTP-U header to identify the relay eNB 104 (or UE 110 or one or more related bearers). This can be an identifier generated for relay eNB 104 by donor eNB 102 such that donor eNB 102 can determine the relay eNB 104, or one or more downstream relay eNBs is to receive the translated packet, as described above. For example, this can be based at least in part on locating at least a portion of the identifier in a routing table at donor eNB 102. In addition, headers can be compressed, in one example, as described. As shown, MME 1102 can communicate with SGW 1104, and MME 1114 to SGW 1116, using an S11 interface. PGWs 1106 and 1118 can communicate with PCRF 1108 over a Gx interface. Furthermore, PCRF 1108 can communicate with IMS 1110 using an Rx interface, and PGW 1118 can communicate with IMS 1110 and/or the internet 1112 using an SGi interface.

Figure 12:
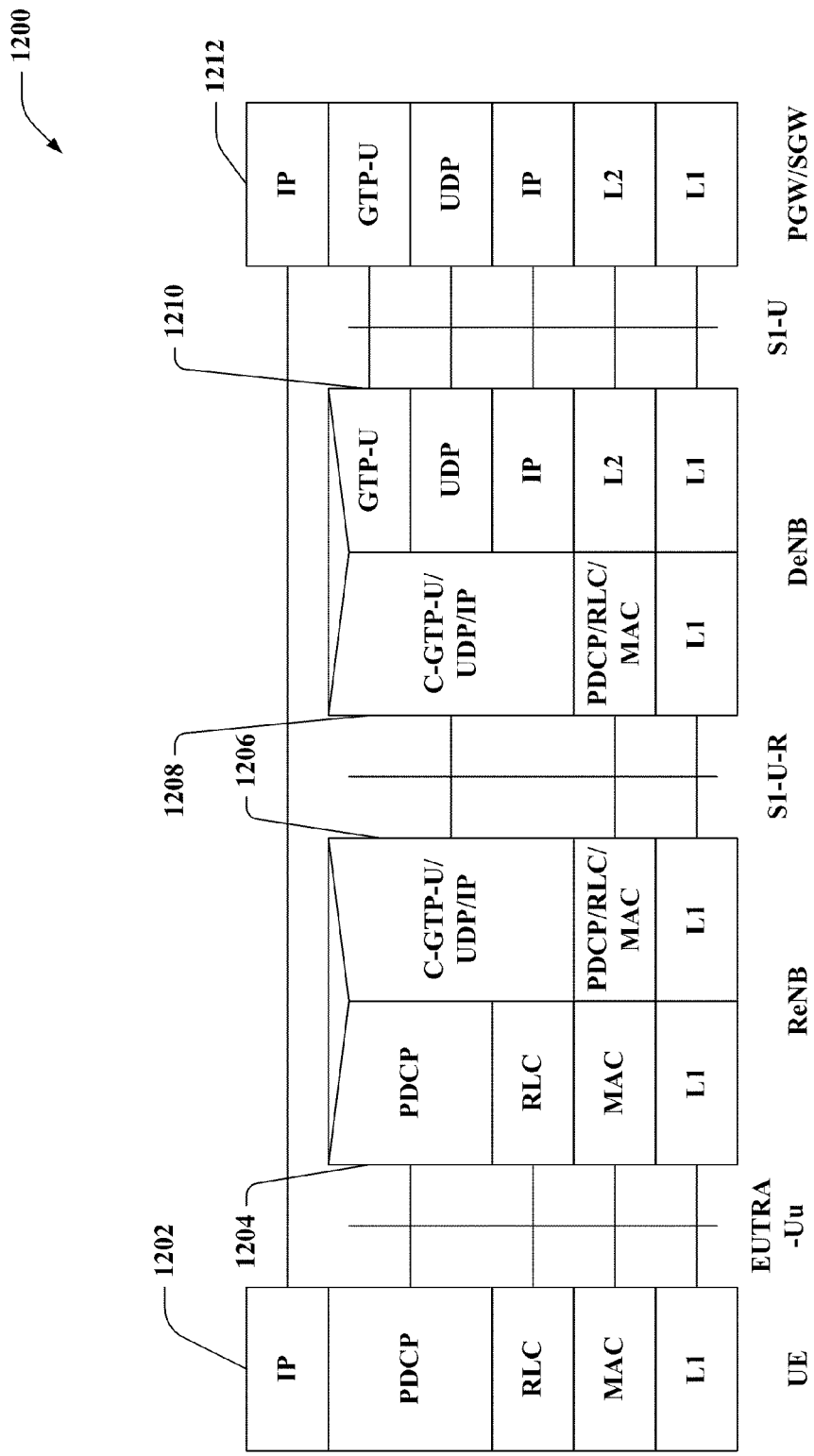
FIG. 12 is an illustration of example protocol stacks that facilitate providing cell relay functionality for data plane communications.

Referring to FIG. 12, example protocol stacks 1200 are illustrated that facilitate communicating in a wireless network to provide cell relay functionality for data (e.g., user) plane communications using a TEID for packet routing. A UE protocol stack 1202 is shown comprising an L1 layer, MAC layer, an RLC layer, a PDCP layer, and an IP layer. A relay eNB (ReNB) access link protocol stack 1204 is depicted having an L1 layer, MAC layer, RLC layer, and PDCP layer, as well as an ReNB backhaul link protocol stack 1206 having an L1 layer, PDCP/RLC/MAC layer, and a C-GTP-U/UDP/IP layer, which can be a compressed layer in one example, to facilitate routing packets on the backhaul (e.g., by populating the TEID with the ReNB address, as described previously). A donor eNB (DeNB) access link protocol stack 1208 is also shown having an L1 layer, PDCP/RLC/MAC layer, and a C-GTP/UDP/IP layer, as well as a DeNB backhaul link protocol stack 1210 having an L1 layer, L2 layer, an IP layer, a UDP layer, and a GTP-U layer to maintain communications with a PGW/SGW using an address assigned by the PGW/SGW. PGW/SGW protocol stack 1212 has an L1 layer, L2, layer, IP layer related to an address assigned to the DeNB, UDP layer, GTP-U layer, and another IP layer related to an address assigned to the UE.

According to an example, a UE can communicate with an ReNB to receive access to a PGW/SGW. In this regard, UE can communicate over L1, MAC, RLC, and PDCP layers with the ReNB over using a EUTRA-Uu interface, as shown between protocol stacks 1202 and 1204. The UE can tunnel IP layer communications through the ReNB and other entities to the PGW/SGW, which assigns an IP address to the UE, as shown between protocol stacks 1202 and 1212. To facilitate such tunneling, the ReNB communicates with a DeNB over L1, PDCP/RLC/MAC, and C-GTP-U/UDP/IP layers using an S1-U-R interface, as shown between protocol stacks 1206 and 1208. As described, the S1-U-R interface can be a newly defined interface that utilizes a disparate transport layer than communications between DeNB and PGW/SGW. In this regard, communications between ReNB and DeNB additionally use a compressed version of the GTP-U, UDP/IP headers. Moreover, this compressed header can indicate TEID, as described herein, of the ReNB in the GTP-U header to facilitate return communications, as described, herein. DeNB can decouple the C-GTP-U/UDP/IP header from the transport layer and communicate with the PGW over separate GTP-U, UDP, and IP layers on top of L1 and L2 physical layers over an S1-U interface, as shown between protocol stacks 1210 and 1212. The same can be true for downlink communications, as described, where DeNB decouples the GTP, UDP, and IP layers from the transport layers, compresses them into a C-GTP-U/UDP/IP header, and transmits over the PDCP/RLC/MAC and L1 layers to the ReNB. DeNB, as described, can use a TEID in the GTP-U header to route the packet to the ReNB. In one example, this mitigates the need for UDP/IP routing on the backhaul, etc.

Figure 13:
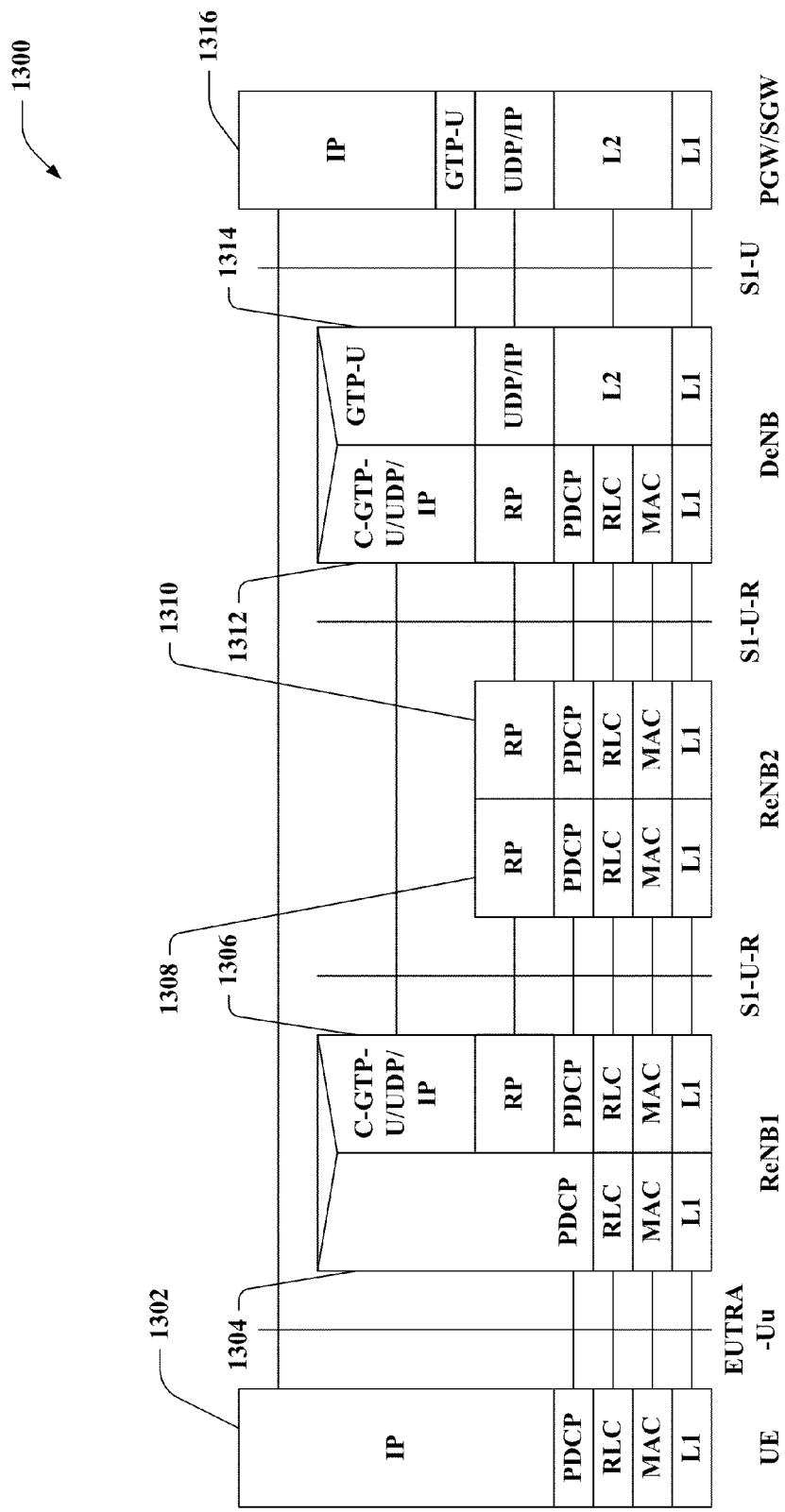
FIG. 13 is an illustration of example protocol stacks that facilitate providing cell relay functionality for data plane communications using a relay protocol.

Referring to FIG. 13, example protocol stacks 1300 are illustrated that facilitate communicating in a wireless network to provide cell relay functionality for data (e.g., user) plane communications using a relay protocol. A UE protocol stack 1302 is shown comprising an L1 layer, MAC layer, an RLC layer, a PDCP layer, and an IP layer. A relay eNB1 (ReNB) access link protocol stack 1304 is depicted having an L1 layer, MAC layer, RLC layer, and PDCP layer, as well as an ReNB 1 backhaul link protocol stack 1306 having an L1 layer, MAC layer, RLC layer, PDCP layer, relay protocol (RP) layer, and a C-GTP-U/UDP/IP layer, which can be a compressed layer in one example, to facilitate communicating packets on the backhaul. An intermediary ReNB2 access link protocol stack 1308 is shown having an L1 layer, MAC layer, RLC layer, PDCP layer, and RP layer, as well as a backhaul link protocol stack 1310 for the intermediary ReNB2 having the same layers.

A DeNB access link protocol stack 1308 is also shown having an L1 layer, MAC layer, RLC layer, PDCP layer, RP layer, and a C-GTP/UDP/IP layer, as well as a DeNB backhaul link protocol stack 1310 having an L1 layer, L2 layer, a UDP/IP layer, and a GTP-U layer to maintain communications with a PGW/SGW using an address assigned by the PGW/SGW. PGW/SGW protocol stack 1312 has an L1 layer, L2, layer, UDP/IP layer related to an address assigned to the DeNB, GTP-U layer, and another IP layer related to an address assigned to the UE.

According to an example, a UE can communicate with an ReNB1 to receive access to a PGW/SGW. In this regard, UE can communicate over L1, MAC, RLC, and PDCP layers with the ReNB1 over using a EUTRA-Uu interface, as shown between protocol stacks 1302 and 1304. The UE can tunnel IP layer communications through the ReNB1 and other entities to the PGW/SGW, which assigns an IP address to the UE, as shown between protocol stacks 1302 and 1316. To facilitate such tunneling, ReNB1 communicates with ReNB2 over an RP, as described herein, on top of L1, MAC, RLC, PDCP layers using an S1-U-R interface (or other new interface for communicating using a relay protocol), as shown between protocol stacks 1306 and 1308. In addition, the RP can carry the upper layer C-GTP-U/UDP/IP layer in the RP payload, as described previously, to the disparate RP, as shown between protocol stacks 1306 and 1308. Moreover, as described, the RP header can include an identifier of ReNB1, an IP address of the PGW/SGW, a protocol type indicating C-GTP-U/UDP/IP data in the RP payload, and/or the like.

ReNB2, and any other intermediary ReNBs, can forward the RP communication to the DeNB, as shown between protocol stacks 1310 and 1312. In this example, DeNB can receive the RP packet, over the lower layers, and can extract the C-GTP-U/UDP/IP packet from the payload and communicate with the PGW over separate GTP-U, UDP, and IP layers on top of L1 and L2 physical layers over an S1-U interface, as shown between protocol stacks 1314 and 1316. In one example, the DeNB can include the relay identifier from the RP packet header in the GTP-U communications. Thus, as described, downlink communications from PGW/SGW protocol stack 1312 can include the relay identifier. In this regard, upon receiving downlink communications from PGW/SGW protocol stack 1316 over DeNB backhaul link protocol stack 1314, DeNB access link protocol stack 1312 can generate an RP packet with a header comprising the relay identifier received over PGW/SGW protocol stack 1316 and a compressed GTP-U/UDP/IP packet as the payload. DeNB access link protocol stack 1312 can transmit the RP packet over ReNB2 backhaul link protocol stack 1312, which can forward the RP packet over ReNB2 access link protocol stack 1308 to ReNB backhaul link protocol stack 1306 based on the relay identifier in the RP header, as described. ReNB 1 backhaul link protocol stack 1306 can obtain the C-GTP-U/UDP/IP payload of the RP packet and forward to UE protocol stack 1302, where the RP packet payload is of certain types, as described.

Figure 14:
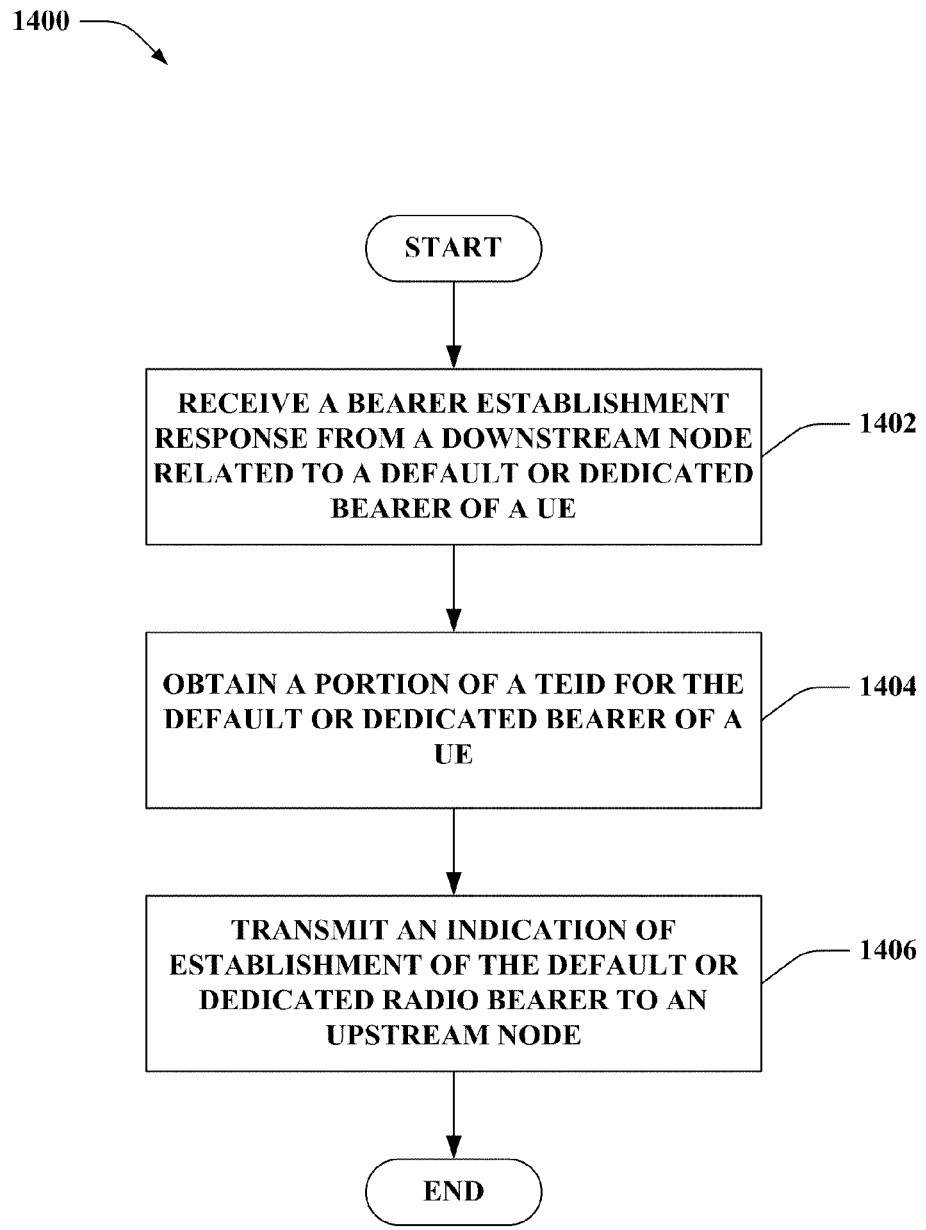
FIG. 14 is an illustration of an example methodology for obtaining a TEID portion for a bearer upon receiving an indication of bearer establishment.
Figure 15:
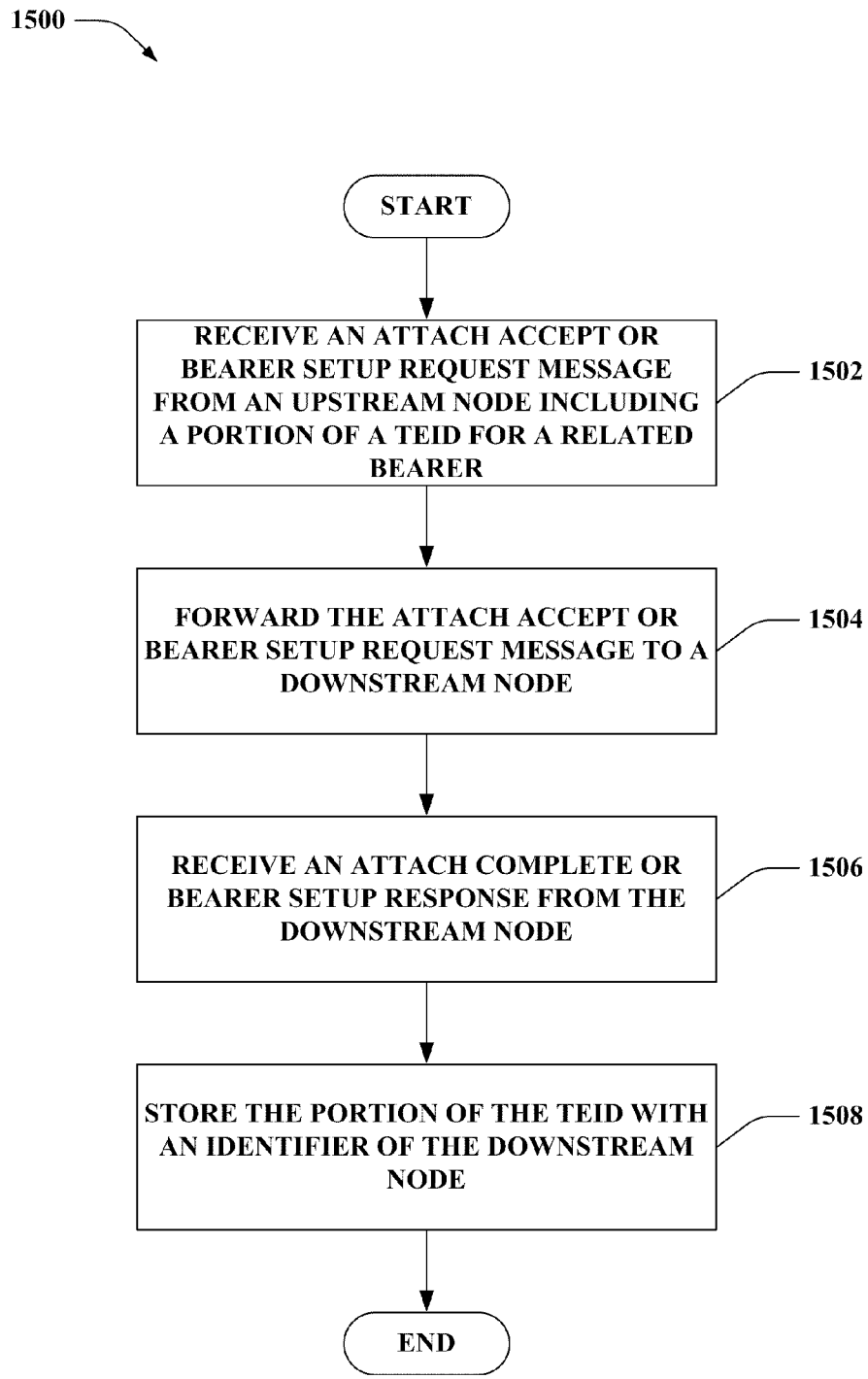
FIG. 15 is an illustration of an example methodology that creates associations of TEIDs to downstream nodes upon network attachment for subsequent packet routing.
Figure 16:
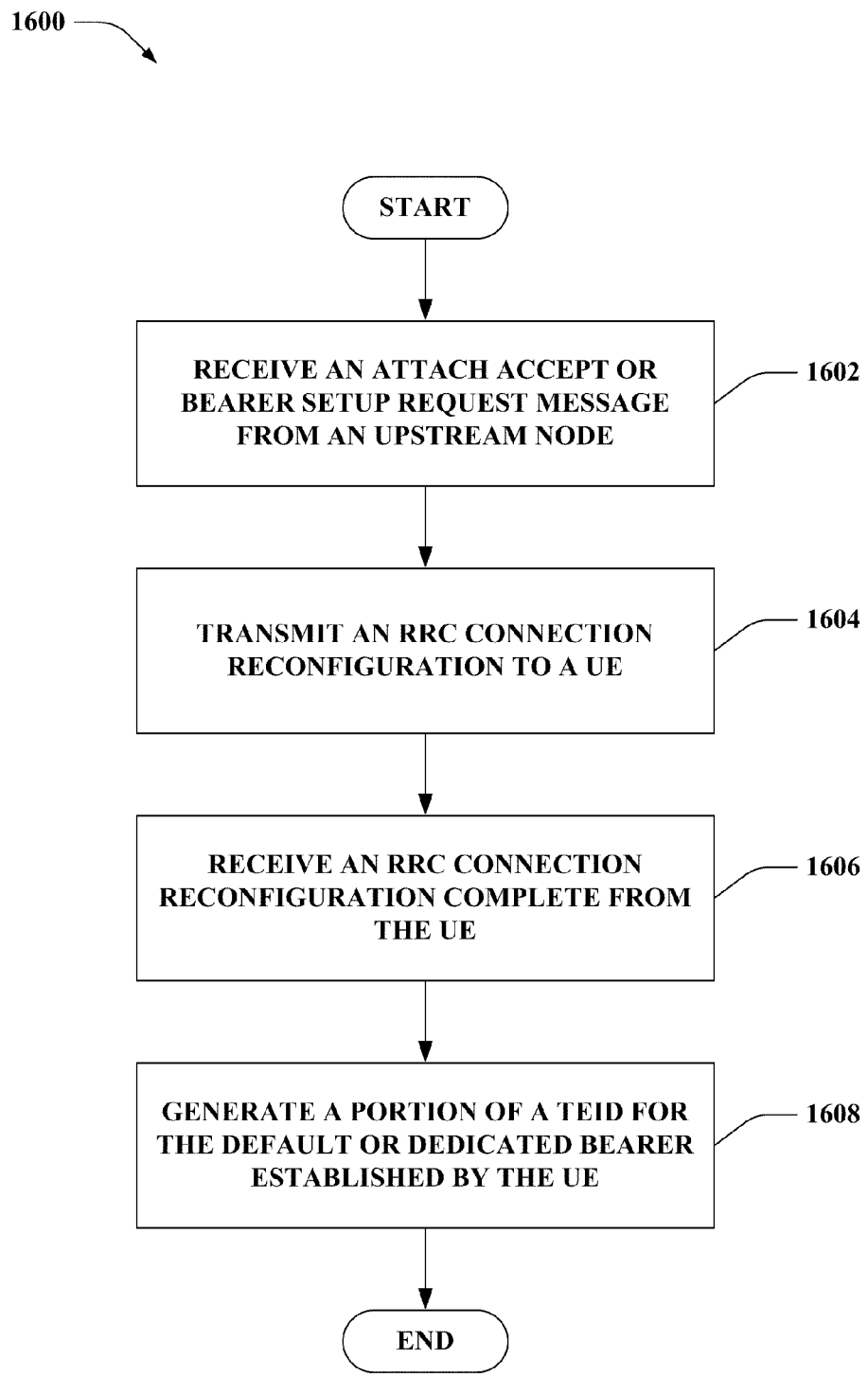
FIG. 16 is an illustration of an example methodology that generates local TEID portions for subsequent routing of packets to a related UE bearer.

Referring to FIGS. 14-16, methodologies relating to providing device attachment and bearer activation with cell relays in wireless networks are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning to FIG. 14, an example methodology 1400 that facilitates device attachment and bearer activation utilizing cell relays in wireless networks is illustrated. At 1402, a bearer establishment response related to a default or dedicated bearer of a UE can be received from a downstream node. In one example, the downstream node can be the UE or one or more relay eNBs. At 1004, a portion of a TEID for the default or dedicated bearer can be maintained. As described, this can include receiving the portion of the TEID from an upstream eNB, for example, during a network attachment in an attach accept, in a bearer setup request, and/or the like. In another example, obtaining the portion of the TEID can include generating the portion of the TEID upon receiving the bearer establishment response, a network attachment request, a bearer setup request, and/or the like. At 1406, an indication of establishment of the default or dedicated radio bearer can be transmitted to an upstream node. In one example, this can include the TEID. In addition, for example, the upstream node can store the portion of the TEID along with an identifier of a next downstream relay eNB upon receiving the indication, as described.

Referring to FIG. 15, an example methodology 1500 is shown that facilitates storing TEIDs with downstream node identifiers upon bearer activation and/or attachment for subsequent packet routing. At 1502, an attach accept or bearer setup request message can be received from an upstream node including a portion of a TEID for a related bearer. For example, this can be received from a donor eNB or one or more intermediary relay eNBs. At 1504, the attach accept or bearer setup request message can be forwarded to a downstream node, such as a relay eNB, to facilitate establishing a bearer at a downstream UE. At 1506, an attach complete or bearer setup response can be received from the downstream node. Upon receiving the attach complete or bearer setup response, the portion of the TEID can be stored with an identifier of the downstream node at 1508. As described, the stored association between the TEID and the identifier can be used for subsequent packet routing.

Turning to FIG. 16, an example methodology 1600 that facilitates establishing a bearer at a UE based on an attach accept or bearer setup request message is illustrated. At 1602, an attach accept or bearer setup request message can be received from an upstream node. As described, this can be part of a process to attach a UE to a wireless network or to request dedicated bearer activation therefrom. At 1604, an RRC connection reconfiguration can be transmitted to a UE to establish the default or dedicated radio bearer. At 1606, an RRC connection reconfiguration complete can be received from the UE. At 1608, a portion of a TEID can be generated for the default or dedicated bearer established by the UE. In addition, for example, the portion of the TEID can be stored for subsequent packet routing, transmitted to one or more upstream nodes, and/or the like. In another example, generating the portion of the TEID 1608 can be performed by a remote node, and the portion of the TEID can be received and stored in this example, as described.

It will be appreciated that, in accordance with one or more aspects described herein, inferences can be made regarding generating a TEID or a portion thereof, determining one or more network nodes related to a TEID, and/or other aspects described herein. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 17:
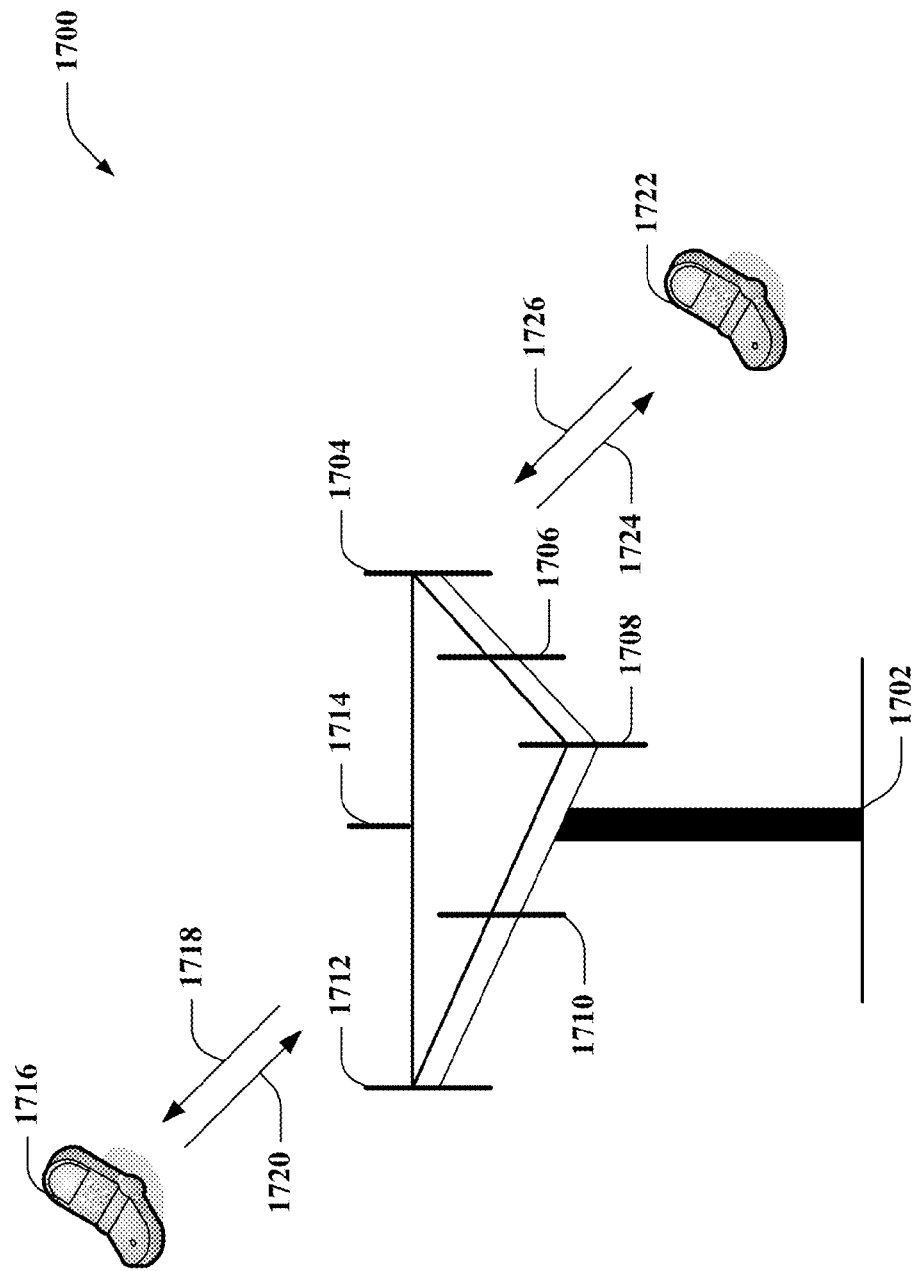
FIG. 17 is an illustration of a wireless communication system in accordance with various aspects set forth herein.

Referring now to FIG. 17, a wireless communication system 1700 is illustrated in accordance with various embodiments presented herein. System 1700 comprises a base station 1702 that can include multiple antenna groups. For example, one antenna group can include antennas 1704 and 1706, another group can comprise antennas 1708 and 1710, and an additional group can include antennas 1712 and 1714. Two antennas are illustrated for each antenna group; however, more or fewer antennas can be utilized for each group. Base station 1702 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1702 can communicate with one or more mobile devices such as mobile device 1716 and mobile device 1722; however, it is to be appreciated that base station 1702 can communicate with substantially any number of mobile devices similar to mobile devices 1716 and 1722. Mobile devices 1716 and 1722 can be, for example, cellular phones, smart phones, laptops, handheld communication devices, handheld computing devices, satellite radios, global positioning systems, PDAs, and/or any other suitable device for communicating over wireless communication system 1700. As depicted, mobile device 1716 is in communication with antennas 1712 and 1714, where antennas 1712 and 1714 transmit information to mobile device 1716 over a forward link 1718 and receive information from mobile device 1716 over a reverse link 1720. Moreover, mobile device 1722 is in communication with antennas 1704 and 1706, where antennas 1704 and 1706 transmit information to mobile device 1722 over a forward link 1724 and receive information from mobile device 1722 over a reverse link 1726. In a frequency division duplex (FDD) system, forward link 1718 can utilize a different frequency band than that used by reverse link 1720, and forward link 1724 can employ a different frequency band than that employed by reverse link 1726, for example. Further, in a time division duplex (TDD) system, forward link 1718 and reverse link 1720 can utilize a common frequency band and forward link 1724 and reverse link 1726 can utilize a common frequency band.

Each group of antennas and/or the area in which they are designated to communicate can be referred to as a sector of base station 1702. For example, antenna groups can be designed to communicate to mobile devices in a sector of the areas covered by base station 1702. In communication over forward links 1718 and 1724, the transmitting antennas of base station 1702 can utilize beamforming to improve signal-to-noise ratio of forward links 1718 and 1724 for mobile devices 1716 and 1722. Also, while base station 1702 utilizes beamforming to transmit to mobile devices 1716 and 1722 scattered randomly through an associated coverage, mobile devices in neighboring cells can be subject to less interference as compared to a base station transmitting through a single antenna to all its mobile devices. Moreover, mobile devices 1716 and 1722 can communicate directly with one another using a peer-to-peer or ad hoc technology (not shown).

According to an example, system 1700 can be a multiple-input multiple-output (MIMO) communication system. Further, system 1700 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1702 can communicate to the mobile devices 1716 and 1722 over the channels, which can be create for various types of data. For example, channels can be created for communicating various types of general communication data, control data (e.g., quality information for other channels, acknowledgement indicators for data received over channels, interference information, reference signals, etc.), and/or the like.

Figure 18:
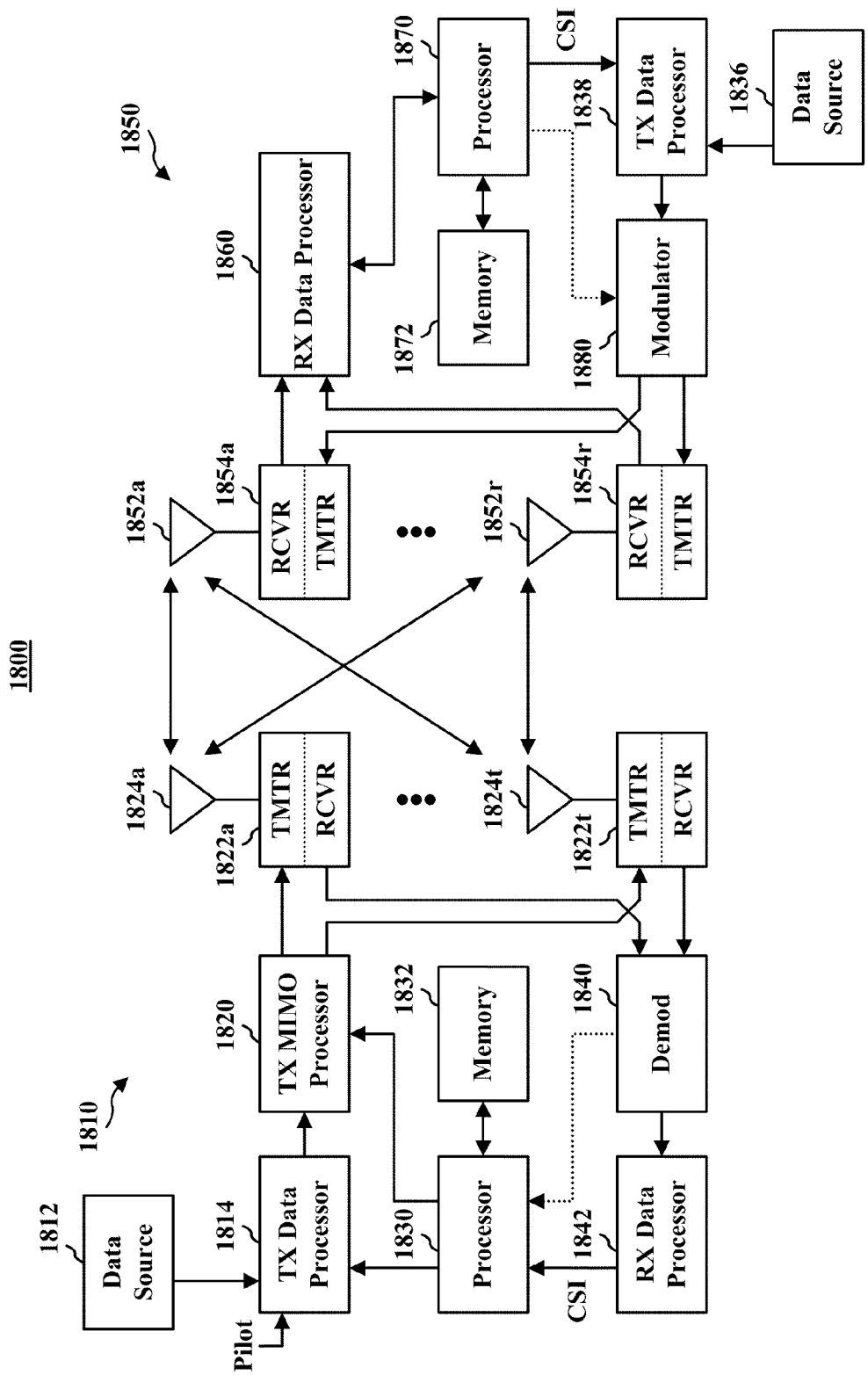
FIG. 18 is an illustration of an example wireless network environment that can be employed in conjunction with the various systems and methods described herein.

FIG. 18 shows an example wireless communication system 1800. The wireless communication system 1800 depicts one base station 1810 and one mobile device 1850 for sake of brevity. However, it is to be appreciated that system 1800 can include more than one base station and/or more than one mobile device, wherein additional base stations and/or mobile devices can be substantially similar or different from example base station 1810 and mobile device 1850 described below. In addition, it is to be appreciated that base station 1810 and/or mobile device 1850 can employ the systems (FIGS. 1-11 and 17), protocol stacks (FIGS. 12-13) and/or methods (FIGS. 14-16) described herein to facilitate wireless communication therebetween.

At base station 1810, traffic data for a number of data streams is provided from a data source 1812 to a transmit (TX) data processor 1814. According to an example, each data stream can be transmitted over a respective antenna. TX data processor 1814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1830.

The modulation symbols for the data streams can be provided to a TX MIMO processor 1820, which can further process the modulation symbols (e.g., for OFDM). TX MIMO processor 1820 then provides $N_T$ modulation symbol streams to $N_T$ transmitters (TMTR) 1822a through 1822t. In various aspects, TX MIMO processor 1820 applies beamforming weights to the symbols of the data streams and to the antenna from which the symbol is being transmitted.

Each transmitter 1822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1822a through 1822t are transmitted from $N_T$ antennas 1824a through 1824t, respectively.

At mobile device 1850, the transmitted modulated signals are received by $N_R$ antennas 1852a through 1852r and the received signal from each antenna 1852 is provided to a respective receiver (RCVR) 1854a through 1854r. Each receiver 1854 conditions (e.g., filters, amplifies, and down-converts) a respective signal, digitizes the conditioned signal to provide samples, and further processes the samples to provide a corresponding "received" symbol stream.

An RX data processor 1860 can receive and process the $N_R$ received symbol streams from $N_R$ receivers 1854 based on a particular receiver processing technique to provide $N_T$ "detected" symbol streams. RX data processor 1860 can demodulate, deinterleave, and decode each detected symbol stream to recover the traffic data for the data stream. The processing by RX data processor 1860 is complementary to that performed by TX MIMO processor 1820 and TX data processor 1814 at base station 1810.

A processor 1870 can periodically determine which precoding matrix to utilize as discussed above. Further, processor 1870 can formulate a reverse link message comprising a matrix index portion and a rank value portion.

The reverse link message can comprise various types of information regarding the communication link and/or the received data stream. The reverse link message can be processed by a TX data processor 1838, which also receives traffic data for a number of data streams from a data source 1836, modulated by a modulator 1880, conditioned by transmitters 1854a through 1854r, and transmitted back to base station 1810.

At base station 1810, the modulated signals from mobile device 1850 are received by antennas 1824, conditioned by receivers 1822, demodulated by a demodulator 1840, and processed by a RX data processor 1842 to extract the reverse link message transmitted by mobile device 1850. Further, processor 1830 can process the extracted message to determine which precoding matrix to use for determining the beamforming weights.

Processors 1830 and 1870 can direct (e.g., control, coordinate, manage, etc.) operation at base station 1810 and mobile device 1850, respectively. Respective processors 1830 and 1870 can be associated with memory 1832 and 1872 that store program codes and data. Processors 1830 and 1870 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 19:
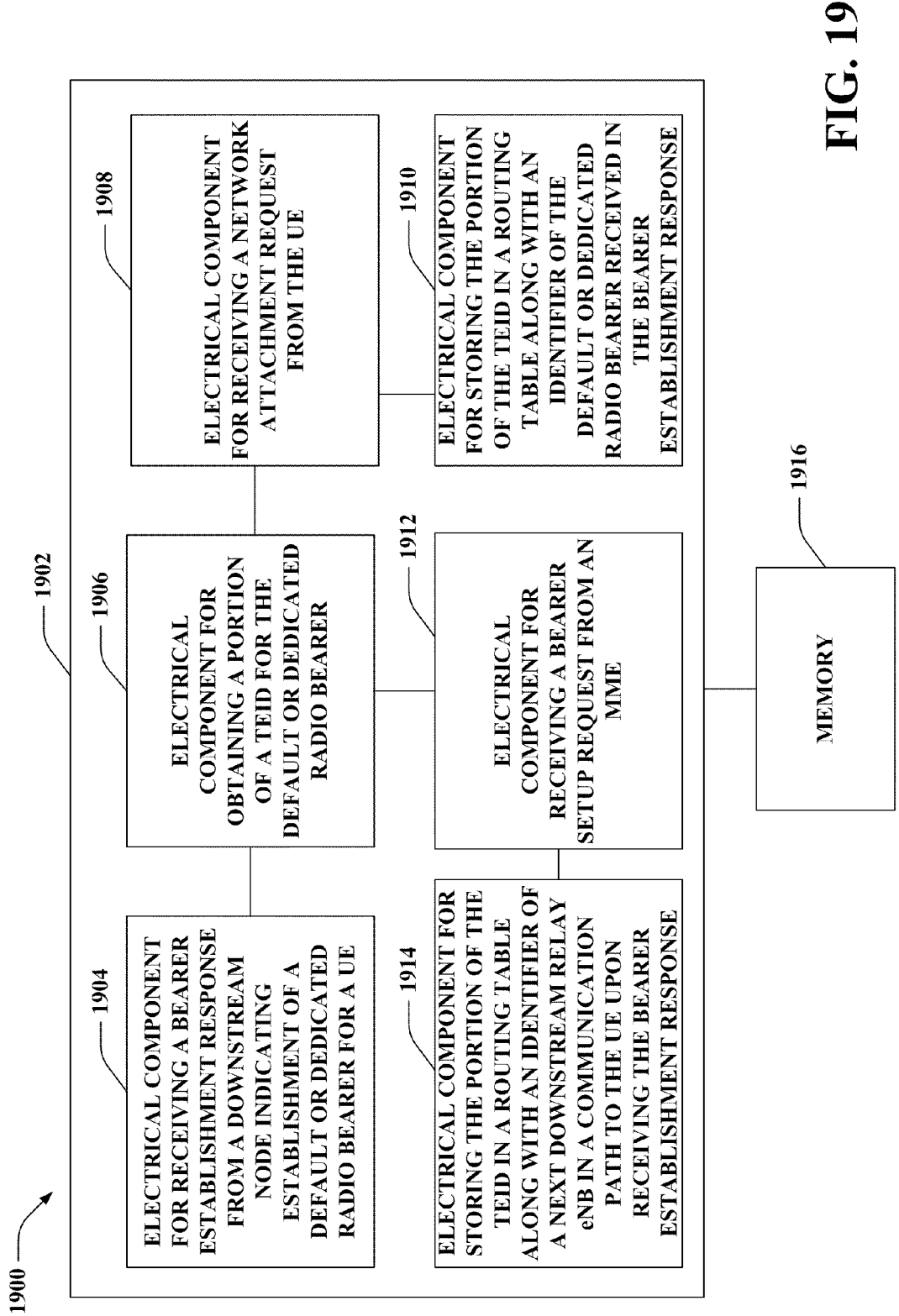
FIG. 19 is an illustration of an example system that facilitates obtaining and storing a TEID portion for a bearer based on receiving a bearer establishment response.

With reference to FIG. 19, illustrated is a system 1900 that facilitates establishing a potion of a TEID for a device during attachment and/or bearer activation. For example, system 1900 can reside at least partially within a base station, mobile device, etc. It is to be appreciated that system 1900 is represented as including functional blocks, which can be functional blocks that represent functions implemented by a processor, software, or combination thereof (e.g., firmware). System 1900 includes a logical grouping 1902 of electrical components that can act in conjunction. For instance, logical grouping 1902 can include an electrical component for receiving a bearer establishment response from a downstream node indicating establishment of a default or dedicated radio bearer for a UE 1904. For example, as described, electrical component 1904 can have previously requested attachment for the UE from an upstream node, and/or forwarded a bearer setup request to the UE from a core network. Additionally, logical grouping 1902 can include an electrical component for obtaining a portion of a TEID for the default or dedicated radio bearer 1906. As described, this can include receiving the portion from an upstream node (e.g., as part of an attach accept, bearer setup request, and/or the like), generating the portion (e.g., based on receiving the establishment response or receiving an attach accept or bearer setup request from an MME).

Moreover, logical grouping 1902 can include an electrical component for receiving a network attachment request from the UE 1908. In addition, for example, logical grouping 1902 can include an electrical component for storing the portion of the TEID in a routing table along with an identifier of the default or dedicated radio bearer received in the bearer establishment response 1910. In this regard, where a network attachment request is received from the UE, a TEID can be generated for the UE by electrical component 1906 and stored by electrical component 1910 for subsequent packet routing, as described. Moreover, logical grouping 1902 can include an electrical component for receiving a bearer setup request from an MME 1912, and an electrical component for storing the portion of the TEID in a routing table along with an identifier of a next downstream relay eNB in a communication part to the UE upon receiving the bearer establishment response 1914. Thus, in this example, where a bearer setup request is received, it can be received with a portion of a TEID for the bearer by electrical component 1912. Upon electrical component 1904 receiving the bearer establishment request, electrical component 1914 can store the received TEID portion for subsequent packet routing, as described. Additionally, system 1900 can include a memory 1916 that retains instructions for executing functions associated with electrical components 1904, 1906, 1908, 1910, 1912, and 1914. While shown as being external to memory 1916, it is to be understood that one or more of electrical components 1904, 1906, 1908, 1910, 1912, and 1914 can exist within memory 1916.

Figure 20:
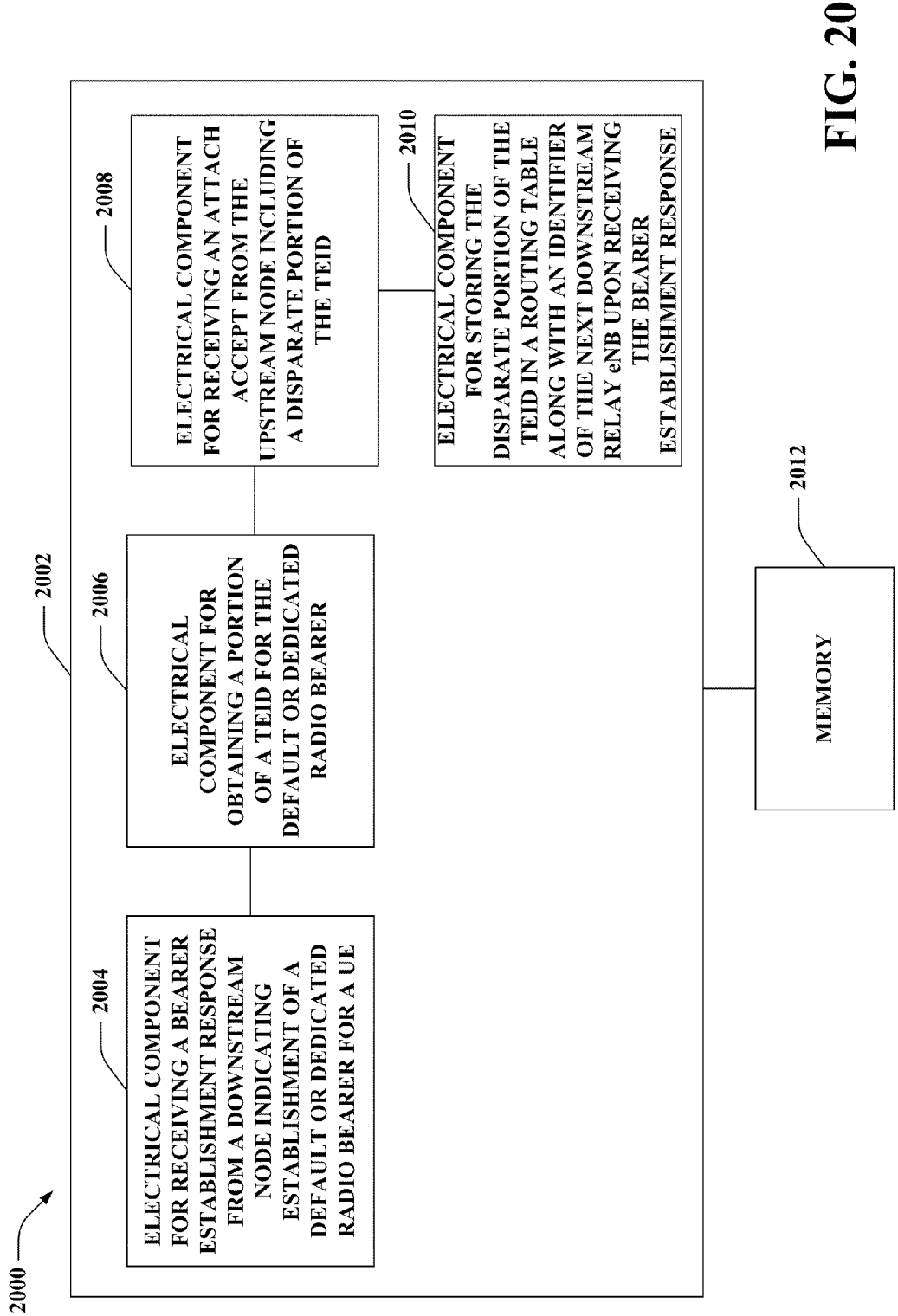
FIG. 20 is an illustration of an example system that receives and stores a TEID portion for a bearer based on receiving a bearer establishment response.

With reference to FIG. 20, illustrated is a system 2000 that facilitates storing TEIDs for UE bearers during attachment or bearer activation. For example, system 2000 can reside at least partially within a base station, mobile device, etc. It is to be appreciated that system 2000 is represented as including functional blocks, which can be functional blocks that represent functions implemented by a processor, software, or combination thereof (e.g., firmware). System 2000 includes a logical grouping 2002 of electrical components that can act in conjunction. For instance, logical grouping 2002 can include an electrical component for receiving a bearer establishment response from a downstream node indicating establishment of a default or dedicated radio bearer for a UE 2004. For example, as described, the downstream node can be the UE or one or more relay eNBs in a communication path to the UE. Additionally, logical grouping 2002 can include an electrical component for obtaining a portion of a TEID for the default or dedicated radio bearer 2006.

Electrical component 2006, for example, can generate the portion of the TEID where the downstream node is the UE and/or receive the portion of the TEID where the downstream node is a relay eNB (e.g., in this example, the portion of the TEID can be received from an upstream node). Moreover, logical grouping 2002 can include an electrical component for receiving an attach accept from the upstream node including a disparate portion of the TEID 2008. In addition, logical grouping 2002 can include an electrical component for storing the disparate portion of the TEID in a routing table along with an identifier of the next downstream relay eNB upon receiving the bearer establishment response 2010. Thus, for example, in subsequent communications, packets can be routed to the UE through various eNBs based on locating a TEID in the communications within a routing table and determining a next node to receive the communications therefrom, as described. Additionally, system 2000 can include a memory 2012 that retains instructions for executing functions associated with electrical components 2004, 2006, 2008, and 2010. While shown as being external to memory 2012, it is to be understood that one or more of electrical components 2004, 2006, 2008, and 2010 can exist within memory 2012.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   receiving a bearer establishment response at a relay node from a user equipment (UE) indicating establishment of a default or dedicated radio bearer for the UE;
   obtaining a portion of a tunnel endpoint identifier (TEID) for the default or dedicated radio bearer;
   transmitting an indication of establishment of the default or dedicated radio bearer from the relay node to an upstream node;
   receiving an attach accept from the upstream node including a disparate portion of the TEID; and transmitting a transport address translation request to the upstream node to compress an IP address of a serving gateway (SGW).

2. The method of claim 1, wherein the obtaining the portion of the TEID includes generating the portion of the TEID for the default or dedicated radio bearer.

3. The method of claim 2, wherein the generating the portion of the TEID is based at least in part on receiving an attach accept from a mobility management entity (MME).

4. The method of claim 2, further comprising receiving a network attachment request from the UE.

5. The method of claim 4, further comprising storing the portion of the TEID in a routing table along with an identifier of the default or dedicated radio bearer received in the bearer establishment response.

6. The method of claim 2, further comprising receiving a bearer setup request from the upstream node.

7. The method of claim 6, further comprising storing the portion of the TEID in a routing table along with an identifier of a next downstream relay evolved Node B (eNB) in a communication path to the UE upon receiving the bearer establishment response.

8. The method of claim 6, further comprising forwarding the bearer setup request to a downstream relay evolved Node B (eNB).

9. The method of claim 8, further comprising transmitting a radio resource control (RRC) connection reconfiguration message to the downstream relay eNB to modify one or more quality of service (QoS) characteristics therewith.

10. The method of claim 6, further comprising transmitting a radio resource control (RRC) bearer setup request to the upstream node to modify one or more quality of service (QoS) characteristics therewith.

11. The method of claim 1, further comprising storing the disparate portion of the TEID in a routing table with an identifier of a next downstream relay evolved Node B (eNB) in a communications path to the UE upon receiving the bearer establishment response.

12. The method of claim 1, wherein the transmitting the indication includes transmitting the portion of the TEID with the indication.

13. The method of claim 12, wherein the transmitting the indication includes transmitting a bearer identifier of the default or dedicated radio bearer with the indication.

14. The method of claim 1, wherein the obtaining the portion of the TEID includes determining the portion of the TEID from the bearer establishment response.

15. The method of claim 14, further comprising storing the portion of the TEID with a disparate portion of the TEID generated by one or more upstream evolved Node Bs (eNB) in a bearer mapping table along with an identifier of the default or dedicated radio bearer.

16. A wireless communications apparatus for relaying transmissions, comprising:
at least one processor configured to:
obtain a bearer establishment response from a user equipment (UE) relating to establishment of a default or dedicated radio bearer for the UE;
determine a portion of a tunnel endpoint identifier (TEID) for the default or dedicated radio bearer;
indicate establishment of the default or dedicated radio bearer to an upstream node;
receive an attach accept from the upstream node including a disparate portion of the TEID; and
transmit a transport address translation request to the upstream node to compress an IP address of a serving gateway (SGW); and
a memory coupled to the at least one processor.

17. The wireless communications apparatus of claim 16, wherein the at least one processor determines the portion of the TEID by selecting the portion of the TEID for the default or dedicated radio bearer.

18. The wireless communications apparatus of claim 17, wherein the at least one processor selects the portion of the TEID based at least in part on receiving an attach accept from a mobility management entity (MME).

19. The wireless communications apparatus of claim 17, wherein the at least one processor is further configured to receive a network attachment request from the UE.

20. The wireless communications apparatus of claim 19, wherein the at least one processor is further configured to store an association of the portion of the TEID to an identifier of the default or dedicated radio bearer received in the bearer establishment response in a routing table.

21. The wireless communications apparatus of claim 17, wherein the at least one processor is further configured to receive a bearer setup request from the upstream node.

22. The wireless communications apparatus of claim 21, wherein the at least one processor is further configured to store an association of the portion of the TEID to an identifier of a next downstream relay evolved Node B (eNB) in a communication path to the UE in a routing table upon receiving the bearer establishment response.

23. The wireless communications apparatus of claim 21, wherein the at least one processor is further configured to forward the bearer setup request to a downstream relay evolved Node B (eNB).

24. The wireless communications apparatus of claim 23, wherein the at least one processor is further configured to transmit a radio resource control (RRC) connection reconfiguration message to the downstream relay eNB to modify one or more quality of service (QoS) characteristics therewith.

25. The wireless communications apparatus of claim 21, wherein the at least one processor is further configured to transmit a radio resource control (RRC) bearer setup request to the upstream node to modify one or more quality of service (QoS) characteristics therewith.

26. The wireless communications apparatus of claim 16, wherein the at least one processor is further configured to store an association of the disparate portion of the TEID to an identifier of a next downstream relay evolved Node B (eNB) in a communication path to the UE in a routing table upon receiving the bearer establishment response.

27. The wireless communications apparatus of claim 16, wherein the at least one processor includes the portion of the TEID when indicating establishment of the default or dedicated bearer.

28. An apparatus for relaying transmissions, comprising:
means for receiving a bearer establishment response from a user equipment (UE) indicating establishment of a default or dedicated radio bearer for the UE;
means for obtaining a portion of a tunnel endpoint identifier (TEID) for the default or dedicated radio bearer, wherein the means for receiving the bearer establishment response further transmits an indication of establishment of the default or dedicated radio bearer to an upstream node;
means for receiving an attach accept from the upstream node including a disparate portion of the TEID; and
means for transmitting a transport address translation request to the upstream node to compress an IP address of a serving gateway (SGW).

29. The apparatus of claim 28, wherein the means for obtaining the portion of the TEID generates the portion of the TEID for the default or dedicated radio bearer.

30. The apparatus of claim 29, wherein the means for obtaining the portion of the TEID generates the portion of the TEID based at least in part on receiving an attach accept from a mobility management entity (MME).

31. The apparatus of claim 29, further comprising means for receiving a network attachment request from the UE.

32. The apparatus of claim 31, further comprising means for storing the portion of the TEID in a routing table along with an identifier of the default or dedicated radio bearer received in the bearer establishment response.

33. The apparatus of claim 29, further comprising means for receiving a bearer setup request from the upstream node.

34. The apparatus of claim 33, further comprising means for storing the portion of the TEID in a routing table along with an identifier of a next downstream relay evolved Node B (eNB) in a communication path to the UE upon receiving the bearer establishment response.

35. The apparatus of claim 33, wherein the means for receiving the bearer setup request forwards the bearer setup request to a downstream relay evolved Node B (eNB).

36. The apparatus of claim 35, wherein the means for receiving the bearer setup request transmits a radio resource control (RRC) connection reconfiguration message to the downstream relay eNB to modify one or more quality of service (QoS) characteristics therewith.

37. The apparatus of claim 33, wherein the means for receiving the bearer setup request transmits a radio resource control (RRC) bearer setup request to the upstream node to modify one or more quality of service (QoS) characteristics therewith.

38. The apparatus of claim 28, further comprising means for storing the disparate portion of the TEID in a routing table along with an identifier of a next downstream relay evolved Node B (eNB) in a communication path to the UE upon receiving the bearer establishment response.

39. The apparatus of claim 28, wherein the means for transmitting the indication transmits the portion of the TEID with the indication.

40. The apparatus of claim 39, wherein the means for transmitting the indication transmits a bearer identifier of the default or dedicated radio bearer with the indication.

41. The apparatus of claim 28, wherein the means for obtaining the portion of the TEID determines the portion of the TEID from the bearer establishment response.

42. The apparatus of claim 41, further comprising means for storing the portion of the TEID with a disparate portion of the TEID generated by one or more upstream evolved Node Bs (eNB) in a bearer mapping table along with an identifier of the default or dedicated radio bearer.

43. A computer program product for relaying transmissions, comprising:
a non-transitory computer-readable medium comprising:
code for causing at least one computer to receive a bearer establishment response from a user equipment (UE) indicating establishment of a default or dedicated radio bearer for the UE;
code for causing the at least one computer to obtain at least a portion of a tunnel endpoint identifier (TEID) for the default or dedicated radio bearer; and
code for causing the at least one computer to transmit an indication of establishment of the default or dedicated radio bearer to an upstream node;
code for causing the at least one computer to receive an attach accept from the upstream node including a disparate portion of the TEID; and
code for causing the at least one computer to transmit a transport address translation request to the upstream node to compress an IP address of a serving gateway (SGW).

44. The computer program product of claim 43, wherein the code for causing the at least one computer to obtain the portion of the TEID generates the portion of the TEID for the default or dedicated radio bearer.

45. The computer program product of claim 44, wherein the code for causing the at least one computer to obtain the portion of the TEID generates the portion of the TEID based at least in part on receiving an attach accept from a mobility management entity (MME).

46. The computer program product of claim 44, wherein the computer-readable medium further comprises code for causing the at least one computer to receive a network attachment request from the UE.

47. The computer program product of claim 46, wherein the computer-readable medium further comprises code for causing the at least one computer to store the portion of the TEID in a routing table along with an identifier of the default or dedicated radio bearer received in the bearer establishment response.

48. The computer program product of claim 44, wherein the computer-readable medium further comprises code for causing the at least one computer to receive a bearer setup request from the upstream node.

49. The computer program product of claim 48, wherein the computer-readable medium further comprises code for causing the at least one computer to store the portion of the TEID in a routing table along with an identifier of a next downstream relay evolved Node B (eNB) in a communication path to the UE upon receiving the bearer establishment response.

50. The computer program product of claim 48, wherein the computer-readable medium further comprises code for causing the at least one computer to forward the bearer setup request to a downstream relay evolved Node B (eNB).

51. The computer program product of claim 50, wherein the computer-readable medium further comprises code for causing the at least one computer to transmit a radio resource control (RRC) connection reconfiguration message to the downstream relay eNB to modify one or more quality of service (QoS) characteristics therewith.

52. The computer program product of claim 48, wherein the computer-readable medium further comprises code for causing the at least one computer to transmit a radio resource control (RRC) bearer setup request to the upstream node to modify one or more quality of service (QoS) characteristics therewith.

53. The computer program product of claim 43, wherein the computer-readable medium further comprises code for causing the at least one computer to store the disparate portion of the TEID in a routing table with an identifier of a next downstream relay evolved Node B (eNB) in a communications path to the UE upon receiving the bearer establishment response.

54. The computer program product of claim 43, wherein the code for causing the at least one computer to transmit the indication transmits the portion of the TEID with the indication.

55. A hardware apparatus for relaying transmissions, comprising:

a processing component that receives a bearer establishment response from a user equipment (UE) indicating establishment of a default or dedicated radio bearer for the UE; and a tunnel endpoint identifier (TEID) component that obtains a portion of a TEID for the default or dedicated radio bearer, wherein the processing component further transmits an indication of establishment of the default or dedicated radio bearer to an upstream node, wherein the processing component comprises an attachment request processing component that receives an attach accept from the upstream node including a disparate portion of the TEID, and wherein the attachment request processing component transmits a transport address translation request to the upstream node to compress an IP address of a serving gateway (SGW).

56. The apparatus of claim 55, wherein the TEID component is a TEID suffix generating component that generates the portion of the TEID for the default or dedicated radio bearer.

57. The apparatus of claim 56, wherein the TEID suffix generating component generates the portion of the TEID based at least in part on receiving an attach accept from a mobility management entity (MME).

58. The apparatus of claim 56, wherein the processing component is an attachment request processing component that receives a network attachment request from the UE.

59. The apparatus of claim 58, further comprising a routing table component that stores the portion of the TEID in a routing table along with an identifier of the default or dedicated radio bearer received in the bearer establishment response.

60. The apparatus of claim 55, wherein the TEID component is a TEID assigning component that creates the portion of the TEID for the default or dedicated radio bearer.

61. The apparatus of claim 60, wherein the processing component is a bearer activation processing component that receives a bearer setup request from the upstream node.

62. The apparatus of claim 61, further comprising a routing table component that stores the portion of the TEID in a routing table along with an identifier of a next downstream relay evolved Node B (eNB) in a communication path to the UE upon receiving the bearer establishment response.

63. The apparatus of claim 61, wherein the bearer activation processing component forwards the bearer setup request to a downstream relay evolved Node B (eNB).

64. The apparatus of claim 63, wherein the bearer activation processing component transmits a radio resource control (RRC) connection reconfiguration message to the downstream relay eNB to modify one or more quality of service (QoS) characteristics therewith.

65. The apparatus of claim 61, wherein the bearer activation processing component transmits a radio resource control (RRC) bearer setup request to the upstream node to modify one or more quality of service (QoS) characteristics therewith.

66. The apparatus of claim 55, further comprising a routing table component that stores the disparate portion of the TEID in a routing table with an identifier of the default or dedicated radio bearer upon receiving the bearer establishment response.

67. The apparatus of claim 55, wherein the processing component transmits the portion of the TEID with the indication.

* * * * *